(12) United States Patent
Maekawa et al.

(10) Patent No.: US 8,316,149 B2
(45) Date of Patent: Nov. 20, 2012

(54) INFORMATION COMMUNICATION SYSTEM, SERVER, CONTENT HOLDING DEVICE, CONTENT RECEIVING DEVICE, INFORMATION PROCESSING METHOD, AND PROGRAM

(75) Inventors: Hajime Maekawa, Osaka (JP); Kenichi Matsumoto, Tokyo (JP)

(73) Assignee: Panasonic Corporation, Osaka (JP)

( * ) Notice: Subject to any disclaimer, the term of this patent is extended or adjusted under 35 U.S.C. 154(b) by 364 days.

(21) Appl. No.: 12/596,229

(22) PCT Filed: Apr. 18, 2008

(86) PCT No.: PCT/JP2008/001026
§ 371 (c)(1),
(2), (4) Date: Jan. 8, 2010

(87) PCT Pub. No.: WO2008/129880
PCT Pub. Date: Oct. 30, 2008

(65) Prior Publication Data
US 2010/0121913 A1   May 13, 2010

(30) Foreign Application Priority Data

Apr. 18, 2007  (JP) ............................. P2007-108883

(51) Int. Cl.
*G06F 15/16* (2006.01)
*G06F 15/173* (2006.01)

(52) U.S. Cl. ........................................ 709/236; 709/238

(58) Field of Classification Search .................. 709/204, 709/217, 236, 238
See application file for complete search history.

(56) References Cited

U.S. PATENT DOCUMENTS

| 6,795,866 B1* | 9/2004 | Mankude et al. ............. 709/238 |
| 2004/0064481 A1* | 4/2004 | Azami ....................... 707/104.1 |
| 2006/0265436 A1* | 11/2006 | Edmond et al. ............... 707/204 |

FOREIGN PATENT DOCUMENTS

| JP | 2002-032280 A | | 1/2002 |
| JP | 2004-102450 A | | 4/2004 |
| JP | 2005-109707 A | | 4/2005 |
| JP | 2005109707 A | * | 4/2005 |
| WO | 2008/072358 A1 | | 6/2008 |

OTHER PUBLICATIONS

Machine Translastion of JP2005-109707A from JPO, 2005.*
Multimedia and Internet Dictionary, "Kontiki Delivery Network", [online] [Search date of Feb. 27, 2007 (Heisei 19)], the Internet (URL: http://www.jiten.com/dicmi/docs/k/6780s.htm).
International Search Report for PCT/JP2008/001026.

* cited by examiner

*Primary Examiner* — Brian J Gillis
(74) *Attorney, Agent, or Firm* — Pearne & Gordon LLP

(57) ABSTRACT

A server includes a request information receiving section which receives request information, a correspondence information storage section which stores correspondence information indicating the correspondence of a plurality of content holding devices with content information including fragment content information held by each of the plurality of content holding devices, a specifying section which specifies two or more content holding devices and a plurality of fragment content information elements included in the content information held by the two or more content holding devices, using the correspondence information, so that a series of content information elements requested in the request information can be configured by the plurality of fragment content information elements, and an instruction information transmitting section which transmits instruction information, instructing that specified fragment content information be transmitted to the content receiving device, to a specified content holding device.

18 Claims, 25 Drawing Sheets

FIG. 10

| SERIES-OF-CONTENT-INFORMATION-ELEMENTS ID | CONTENT HOLDING DEVICE ID |
|---|---|
| FC001 | A001 |
| | A002 |
| | A003 |
| | A004 |
| FC002 | A001 |
| | A005 |
| | A008 |
| ⋮ | ⋮ |

CORRESPONDENCE INFORMATION

*FIG. 12*

| DEVICE ID | IP ADDRESS |
|---|---|
| A001 | 100. 100. 100. 101 |
| A002 | 100. 100. 100. 102 |
| A003 | 100. 100. 100. 103 |
| ⋮ | ⋮ |
| A101 | 100. 200. 100. 101 |
| ⋮ | ⋮ |

FIG. 13

CORRESPONDENCE INFORMATION

| SERIES-OF-CONTENT-INFORMATION-ELEMENTS ID | CONTENT HOLDING DEVICE ID |
|---|---|
| FC001 | A001 |
| FC001 | A002 |
| FC001 | A003 |
| FC001 | A004 |
| FC002 | A001 |
| FC002 | A005 |
| FC002 | A008 |
| ⋮ | ⋮ |
| FC101 | A001 |
| ⋮ | ⋮ |

FIG. 18

| CONTENT INFORMATION ID | | CONTENT HOLDING DEVICE ID |
|---|---|---|
| SERIES-OF-CONTENT-INFORMATION-ELEMENTS ID | POSITION INFORMATION | |
| FC001 | 1-20000 | A001 |
| | 1-20000 | A002 |
| | 1-20000 | A003 |
| | 1-20000 | A004 |
| FC002 | 1-5000 | A001 |
| | 5001-10000 | A005 |
| | ⋮ | ⋮ |
| ⋮ | ⋮ | ⋮ |

CORRESPONDENCE INFORMATION

FIG. 19

CORRESPONDENCE INFORMATION

| CONTENT INFORMATION ID | | CONTENT HOLDING DEVICE ID |
|---|---|---|
| SERIES-OF-CONTENT-INFORMATION-ELEMENTS ID | POSITION INFORMATION | |
| FC001 | 1-5000 | A001 |
| | 5001-10000 | A002 |
| | 10001-15000 | A003 |
| | 15001-20000 | A004 |
| FC002 | 1-5000 | A001 |
| | 5001-10000 | A005 |
| | ⋮ | ⋮ |
| ⋮ | ⋮ | ⋮ |

FIG. 20

CORRESPONDENCE INFORMATION

| CONTENT INFORMATION ID ||CONTENT HOLDING DEVICE ID|
|---|---|---|
| SERIES-OF-CONTENT-INFORMATION-ELEMENTS ID | POSITION INFORMATION | |
| FC001 | 1-5000 | A001 |
| | 5001-10000 | A002 |
| | 10001-15000 | A003 |
| | 15001-20000 | A004 |
| | 1-20000 (SERIES) | A005 |
| FC002 | 1-5000 | A001 |
| | 5001-10000 | A005 |
| | ⋮ | ⋮ |
| ⋮ | ⋮ | ⋮ |

FIG. 21

CORRESPONDENCE INFORMATION

| SERIES-OF-CONTENT-INFORMATION-ELEMENTS ID | CONTENT INFORMATION ID | | CONTENT HOLDING DEVICE ID |
|---|---|---|---|
| | POSITION INFORMATION | | |
| FC001 | 1-4000 | | A001 |
| | 5001-9000 | | A002 |
| | 10001-14000 | | A003 |
| | 15001-19000 | | A004 |
| | 4001-5000, 9001-10000, 14001-15000, 19001-20000 | | A005 |
| FC002 | 1-5000 | | A001 |
| | 5001-10000 | | A005 |
| | ---- | | ---- |

INFORMATION COMMUNICATION SYSTEM, SERVER, CONTENT HOLDING DEVICE, CONTENT RECEIVING DEVICE, INFORMATION PROCESSING METHOD, AND PROGRAM

TECHNICAL FIELD

The present invention relates to an information communication system and the like which transmit and receive content information.

BACKGROUND ART

Conventionally, a method has been developed in which content is cut and divided into a plurality of parts and transmitted from a plurality of servers when the content is transmitted (for example, see Non-Patent Document 1).

Non-Patent Document 1: Multimedia and Internet Dictionary, "Kontiki Delivery Network", [online] [Search date of Feb. 27, 2007 (Heisei 19)], the Internet (URL: http://www.jiten.com/dicmi/docs/k/6780s.htm)

DISCLOSURE OF THE INVENTION

Problem that the Invention is to Solve

However, a large number of devices hold fragment content information as information into which a series of content information elements has been fragmented. When a plurality of fragment information elements are transmitted, a device requesting the transmission of the series of content information elements must perform a process of searching for a device holding the fragment content information. There is a problem in that processing of the device requesting the transmission of the series of content information elements increases.

The present invention has been made to solve the above-described problem and an object of the invention is to provide an information communication system and the like that can easily request the transmission of fragment content information even when a plurality of fragment content information elements are transmitted.

Means for Solving the Problem

An information communication system according to the present invention for accomplishing the above-described object is an information communication system including: a server; a plurality of content holding devices holding content information including at least fragment content information as information into which a series of content information elements has been fragmented; a content requesting device which requests the content information; and a content receiving device which receives the fragment content information, wherein the content requesting device includes: a request information transmitting section which transmits request information as information requesting a series of content information elements to the server, wherein the content receiving device includes: a content information receiving section which receives fragment content information transmitted from the content holding devices; and a content information accumulating section which accumulates the fragment content information received by the content information receiving section, wherein the server includes: a request information receiving section which receives the request information; a correspondence information storing section which stores correspondence information as information indicating the correspondence of a plurality of content holding devices with content information including at least fragment content information held by each of the content holding devices; a specifying section which specifies one or more content holding devices and a plurality of fragment content information elements included at least in content information, held by the one or more content holding devices, using the correspondence information so that a series of content information elements requested in request information received by the request information receiving section is able to be configured by the plurality of fragment content information elements; and an instruction information transmitting section which transmits instruction information, as information instructing that fragment content information specified by the specifying section be transmitted to the content receiving device, to a content holding device specified by the specifying section, wherein the content holding device includes: a content information storing section which stores content information including at least fragment content information; an instruction information receiving section which receives the instruction information; and a content information transmitting section which reads the fragment content information indicated by the instruction information received by the instruction information receiving section from the content information storing section and transmits the fragment content information to the content receiving device.

According to this configuration, even when a plurality of fragment content information elements are transmitted, the transmission of fragment content information can be easily requested. The content receiving device can acquire a desired series of content information elements.

In the information communication system according to the present invention, the specifying section may specify a plurality of content holding devices and a plurality of fragment content information elements included at least in content information held by the plurality of content holding devices.

According to this configuration, fragment content information is transmitted from a plurality of content holding devices, thereby efficiently transmitting the fragment content information. For example, in the case where content information is transmitted from one content holding device even when the content receiving device has been connected to a communication link having a wide communication band, a transmission rate of content information is not increased as long as the one content holding device is not connected to a communication link having a wide communication band. On the other hand, even when the plurality of content holding devices are not connected to a communication link having a wide communication band in the case where fragment content information is transmitted from the plurality of content holding devices, the content receiving device can receive a plurality of fragment content information elements transmitted from the plurality of content holding devices together, so that a transmission rate can be increased by the number of content holding devices on the whole of content information received by the content receiving device.

In the information communication system according to the present invention, the content receiving device may further include a content information configuring section which configures a series of content information elements from a plurality of fragment content information elements accumulated by the content information accumulating section, and the content information accumulating section may also accumulate the series of content information elements configured by the content information configuring section.

According to this configuration, a series of content information elements can be configured from a plurality of fragment content information elements.

A server according to the present invention is a server configuring an information communication system having a server, a plurality of content holding devices holding content information including at least fragment content information as information into which a series of content information elements has been fragmented, a content requesting device which requests the content information, and a content receiving device which receives the fragment content information, the server including: a request information receiving section which receives request information as information requesting a series of content information elements transmitted from the content requesting device; a correspondence information storing section which stores correspondence information as information indicating the correspondence of a plurality of content holding devices with content information including at least fragment content information held by each of the plurality of content holding devices; a specifying section which specifies one or more content holding devices and a plurality of fragment content information elements included at least in content information, held by the one or more content holding devices, using the correspondence information so that the series of content information elements requested in the request information received by the request information receiving section is able to be configured by the plurality of fragment content information elements; and an instruction information transmitting section which transmits instruction information, as information instructing that fragment content information specified by the specifying section be transmitted to the content receiving device, to a content holding device specified by the specifying section.

According to this configuration, even when a plurality of fragment content information are transmitted, the transmission of fragment content information can be easily requested. The content receiving device can acquire a desired series of content information elements.

In the server according to the present invention, the specifying section may specify a plurality of content holding devices and a plurality of fragment content information elements included at least in content information held by the plurality of content holding devices.

According to this configuration, fragment content information is transmitted from a plurality of content holding devices, so that the fragment content information can be efficiently transmitted.

In the server according to the present invention, the correspondence information may be information indicating the correspondence of a plurality of content holding devices with a series of fragment content information elements held by each of the plurality of content holding devices.

According to this configuration, the specifying section can determine whether each content holding device holds a series of content information elements requested in request information using correspondence information, and can specify a content holding device using the determination result.

In the server according to the present invention, the instruction information may include fragment specifying information as information for specifying fragment content information included in a series of content information elements held by specified content holding devices.

According to this configuration, a content holding device receiving the instruction information can specify fragment content information of which transmission is requested by fragment specifying information included in the instruction information.

In the server according to the present invention, the specifying section may respectively specify content holding devices holding the series of content information elements requested in the request information and the fragment content information elements into which the series of content information elements has been fragmented by the number of content holding devices holding the series of content information elements.

According to this configuration, a series of content information elements can be fragmented into a proper number of fragments for which fragmentation is possible at the time.

The server according to the present invention may further include: a change request information receiving section which receives change request information as information requesting a change of the correspondence information according to acquisition of a series of content information elements in the content holding devices; and a correspondence information changing section which changes the correspondence information according to the change request information received by the change request information receiving section.

According to this configuration, correspondence information can be changed according to acquisition of a series of content information elements in content holding devices, thereby maintaining the correspondence information in the latest state.

In the server according to the present invention, the correspondence information may include information indicating the correspondence of a plurality of content holding devices with fragment content information held by each of the plurality of content holding devices, and at least fragment content information may be held in the content holding device.

According to this configuration, the server can specify fragment content information held by a content holding device.

The server according to the present invention may further include: a specification request information receiving section which receives specification request information as information requesting the specification of fragment content information included in a series of content information elements to be deleted from the content holding device; a fragment specifying information configuring section which configures, when the specification request information receiving section has received the specification request information, fragment specifying information as information for specifying fragment content information included in a series of content information elements for the content holding device transmitting the specification request information; and a fragment specifying information transmitting section which transmits the fragment specifying information configured by the fragment specifying information configuring section to the content holding device transmitting the specification request information.

According to this configuration, the server can designate fragment content information held by a content holding device. For example, a series of content information elements can be configured by fragment content information held by a plurality of content holding devices.

In the server according to the present invention, the fragment specifying information configuring section may further configure fragment specifying information as information for specifying fragment content information included in related content information held by a related content holding device, which is a content holding device holding related content information as content information including at least part of a series of content information elements for which the specification of fragment content information is requested by the specification request information among content holding devices other than the content holding device transmitting the specification request information, and the fragment specifying information transmitting section may transmit the fragment specifying information, configured by the fragment specifying information configuring section for related content information held by the related holding device, to the related holding device.

According to this configuration, even in a content holding device, which does not transmit specification request information, that is, a related holding device, fragment content information to be held by the related holding device can be designated. Consequently, for example, a series of content information elements can be configured by fragment content information held by a plurality of content holding devices.

In the server according to the present invention, the related content information may be fragment content information.

According to this configuration, the server can enable a content holding device to hold fragment content information into which the fragment content information has been further fragmented.

In the server according to the present invention, the fragment specifying information configuring section may configure fragment specifying information for fragmentation into a number of fragments according to the number of content holding devices holding at least part of a series of content information elements for which the specification of fragment content information has been requested by the specification request information received by the specification request information receiving section.

According to this configuration, a series of content information elements can be fragmented into a proper number of fragments for which fragmentation is possible at the time.

The server according to the present invention may further include: a change request information receiving section which receives change request information as information requesting a change of the correspondence information according to the fragmentation of content information in the content holding device; and a correspondence information changing section which changes the correspondence information according to the change request information received by the change request information receiving section.

According to this configuration, correspondence information can be changed according to fragmentation of a series of content information elements in content holding devices and the correspondence information can be maintained in the latest state.

The server according to the present invention may further include: a change request information receiving section which receives change request information as information requesting a change of the correspondence information according to acquisition of a series of content information elements in the content holding devices; a correspondence information changing section which changes the correspondence information according to the change request information received by the change request information receiving section; a fragment specifying information configuring section which respectively configures fragment specifying information as information for specifying fragment content information included in a series of content information elements for every plurality of content holding devices holding the series of content information elements serving as a fragmentation target; and a fragment specifying information transmitting section which transmits the fragment specifying information configured by the fragment specifying information configuring section to a content holding device corresponding to the fragment specifying information, wherein the correspondence information changing section changes the correspondence information according to transmission of the fragment specifying information.

According to this configuration, fragment specifying information is transmitted from the server to a content holding device at the predetermined timing, so that the fragmentation of content information can be performed in the content holding device. Correspondence information can be changed according to the fragmentation of content information and the correspondence information can be maintained in the latest state.

In the server according to the present invention, the fragment specifying information configuring section may configure fragment specifying information for fragmentation into a number of fragments according to the number of content holding devices holding a series of content information elements serving as the fragmentation target.

According to this configuration, a series of content information elements can be fragmented into a proper number of fragments for which fragmentation is possible at the time.

In the server according to the present invention, the specifying section may specify one or more content holding devices holding content information including at least part of a series of content information elements requested in the request information received by the request information receiving section and a plurality of fragment content information elements included at least in content information held by the one or more content holding devices using the correspondence information so that a series of content information elements requested in the request information is able to be configured by the plurality of fragment content information elements and at least one fragment content information element of the plurality of fragment content information elements is redundant fragment content information capable of being configured by other fragment content information.

According to this configuration, in the case where at least one fragment content information element transmitted from a content holding device is redundant fragment content information capable of being configured by other fragment content information, a desired series of content information elements can be configured in the content receiving device even when the content receiving device has not received the redundant fragment content information due to an error or the like.

A server according to the present invention is a server configuring an information communication system having the server and a plurality of content holding devices holding content information including at least fragment content information as information into which a series of content information elements has been fragmented, the server including: a correspondence information storing section which stores correspondence information as information indicating the correspondence of the plurality of content holding devices with content information including at least fragment content information held by each of the plurality of content holding devices; a change request information receiving section which receives change request information as information requesting a change of the correspondence information according to acquisition of a series of content information elements in the content holding devices; a correspondence information changing section which changes the correspondence information according to the change request information received by the change request information receiving section; a fragment specifying information configuring section which respectively configures fragment specifying information as information for specifying fragment content information included in a series of content information elements for every plurality of content holding devices holding the series of content information elements serving as a fragmentation target; and a fragment specifying information transmitting section which transmits the fragment specifying information configured by the fragment specifying information configuring section to a content holding device corresponding to the fragment specifying information.

According to this configuration, fragment specifying information is transmitted to a content holding device, so that the fragmentation of content information can be performed in a content holding device. Correspondence information can be maintained in the latest state by changing the correspondence information according to change request information transmitted from a content holding device. A state of content information held by the content holding device can be managed by the correspondence information.

In the server according to the present invention, the change request information receiving section may also receive change request information requesting a change of the correspondence information according to fragmentation of content information in the content holding device, and the correspondence information changing section may also change the correspondence information in response to the change request information requesting the change of the correspondence information according to the fragmentation of the content information.

According to this configuration, the server can receive change request information transmitted according to fragmentation in a content holding device and change correspondence information according to the change request information. Therefore, the correspondence information is changed after checking that the fragmentation has been performed in the content holding device, so that the correspondence information can be managed with more precision.

In the server according to the present invention, the correspondence information changing section may change the correspondence information according to the transmission of the fragment specifying information.

According to this configuration, a change of correspondence information can be performed according to fragmentation of content information without receiving change request information from a content holding device. Therefore, the information transmission/reception between the server and the content holding device can be reduced. The correspondence information can also be precisely managed by performing proper fragmentation of content information in the content holding device according to fragment specifying information transmitted from the server to the content holding device.

In the server according to the present invention, the fragment specifying information configuring section may configure fragment specifying information for fragmentation into a number of fragments according to the number of content holding devices holding a series of content information elements serving as the fragmentation target.

According to this configuration, a series of content information elements can be fragmented into a proper number of fragments for which fragmentation is possible at the time.

In the server according to the present invention, the information communication system may further have a content receiving device which requests content information and receives fragment content information, and the server may further include: a request information receiving section which receives request information as information requesting a series of content information elements; a specifying section which specifies one or more content holding devices and a plurality of fragment content information elements included at least in content information, held by the one or more content holding devices, using the correspondence information so that a series of content information elements requested by request information received by the request information receiving section is able to be configured by the plurality of fragment content information elements; and a device specifying information transmitting section which transmits device specifying information as information indicating a content holding device and fragment content information specified by the specifying section to the content receiving device.

According to this configuration, the content receiving device can transmit instruction information for acquiring a desired series of content information elements using device specifying information. Therefore, for example, even when management is performed to transmit fragment content information only in response to instruction information from a device to receive fragment content information according to a management request of content information or the like, the content receiving device can receive fragment content information.

A content holding device according to the present invention is a content holding device configuring an information communication system having a server, a plurality of content holding devices holding content information including at least fragment content information as information into which a series of content information elements has been fragmented, and a content receiving device which receives the fragment content information, the content holding device including: a content information storing section which stores content information including at least the fragment content information; an instruction information receiving section which receives instruction information as information instructing that the fragment content information transmitted from the server be transmitted to the content receiving device; and a content information transmitting section which reads the fragment content information indicated by the instruction information received by the instruction information receiving section from the content information storing section and transmits the fragment content information to the content receiving device.

According to this configuration, even when a plurality of fragment content information elements are transmitted, the transmission of fragment content information can be easily requested from the server to a content holding device. The content receiving device can acquire a desired series of content information elements.

In the content holding device according to the present invention, the content information storing section may store at least a series of content information elements, and the content holding device may further include: a fragmentation section which generates fragment content information by fragmenting the series of content information elements stored in the content information storing section and accumulates the fragment content information in the content information storing section.

According to this configuration, fragment content information of a part of which transmission has been instructed among a series of content information elements can be transmitted. Consequently, the content receiving device can acquire a desired series of content information elements.

In the content holding device according to the present invention, the instruction information may include fragment specifying information as information for specifying fragment content information included in a series of content information elements held by specified content holding devices, and the fragmentation section may fragment the series of content information elements using the fragment specification information.

According to this configuration, fragment content information of which transmission has been instructed can be specified by fragment specifying information.

The content holding device according to the present invention may further include: a content information acquiring section which acquires a series of content information elements and accumulates the series of content information elements in the content information storing section; and a change request information transmitting section which transmits change request information as information requesting a change according to acquisition of the series of content information elements by the content information acquiring section for correspondence information as information held by the server and information indicating the correspondence of the plurality of content holding devices with content information held by the plurality of content holding devices.

According to this configuration, a series of content information elements can be acquired and change request information can be transmitted to the server according to the acquisition, so that correspondence information, which is managed by the server, can be maintained in the latest state.

In the content holding device according to the present invention, the content information storing section may store at least fragment content information.

According to this configuration, for example, fragment content information stored in the content information storing section can be transmitted to the content receiving device according to received instruction information.

The content holding device according to the present invention may further include: a deletion instruction receiving section which receives an instruction about the deletion of the series of content information elements stored in the content information storing section, wherein the fragmentation section may fragment the series of content information elements for which the deletion instruction receiving section has received the deletion instruction, generate the fragment content information, and delete the series of content information elements for which the deletion instruction has been received.

According to this configuration, when a deletion instruction for a series of content information elements has been received, the series of content information elements is fragmented to generate fragment content information, so that the fragment content information can be continuously held. Consequently, the number of content holding devices holding the fragment content information regarding the series of content information elements for which the deletion instruction has been received can be increased.

The content holding device according to the present invention may further include: a specification request information transmitting section which transmits specification request information as information requesting the specification of fragment content information included in the series of content information elements to be deleted when the deletion instruction receiving section has received the deletion instruction; and a fragment specifying information receiving section which receives fragment specifying information as information for specifying the fragment content information included in the series of content information elements transmitted from the server, and the fragmentation section may generate the fragment content information by fragmenting the series of content information elements to be deleted according to the fragment specifying information received by the fragment specifying information receiving section.

According to this configuration, the server can designate a position of created fragment content information in the case where a deletion instruction for a series of content information elements has been received.

In the content holding device according to the present invention, the fragment specifying information receiving section may also receive fragment specifying information for specifying fragment content information included in related content information as content information including at least part of a series of content information elements for which the specification of the fragment content information is requested in specification request information transmitted by another content holding device.

According to this configuration, when a certain content holding device has received a deletion instruction for a series of content information elements, fragment content information can also be generated for a content holding device holding related content information including at least part of the series of content information elements.

In the content holding device according to the present invention, the related content information may be fragment content information.

According to this configuration, fragment content information can be further fragmented in a content holding device. Consequently, for example, when a series of content information elements can be configured by fragment content information held by 5 content holding devices in the initial step, then the series of content information elements can be configured by fragment content information held by 10 content holding devices by further fragmenting the fragment content information.

The content holding device according to the present invention may further include: a change request information transmitting section which transmits change request information as information requesting a change according to the fragmentation by the fragmentation section for correspondence information as information held by the server and information indicating the correspondence of the plurality of content holding devices with content information held by the plurality of content holding devices.

According to this configuration, change request information is transmitted according to fragmentation, so that the correspondence information can be maintained in the latest state in the server.

The content holding device according to the present invention may further include: a content information acquiring section which acquires a series of content information elements and accumulates the series of content information elements in the content information storing section, and the change request information transmitting section may also transmit change request information, as information requesting a change of the correspondence information according to acquisition of the series of content information elements by the content information acquiring section, to the server.

According to this configuration, correspondence information can be changed according to acquisition of a series of content information elements in content holding devices, thereby maintaining the correspondence information in the latest state.

A content holding device according to the present invention is a content holding device configuring an information communication system having a server and a plurality of content holding devices holding content information including at least fragment content information as information into which a series of content information elements has been fragmented, the content holding device including: a content information storing section in which content information including at least fragment content information is stored; an instruction information receiving section which receives instruction information as information instructing that the fragment content information be transmitted; a content information transmitting section which reads fragment content information indicated by the instruction information received by the instruction information receiving section from the content information storing section and transmits the fragment content information to the content receiving device; a content information acquiring section which acquires a series of content information elements and accumulates the series of content information elements in the content information storing section; a change request information transmitting section which transmits change request information as information requesting a change according to acquisition of the series of content information elements by the content information acquiring section for correspondence information as information held by the server and information indicating the correspondence of the plurality of content holding devices with content information held by the plurality of content holding devices; a fragment specifying information receiving section which receives fragment specifying information as information for specifying the fragment content information included in the series of content information elements transmitted from the server; and a fragmentation section which generates the fragment content information by fragmenting the series of content information elements stored in the content information storing section according to the fragment specifying information received by the fragment specifying information receiving section, and accumulates the fragment content information in the content information storing section.

According to this configuration, content information is fragmented in a content holding device by fragment specifying information transmitted by the server. Correspondence information can be changed according to acquisition of a series of content information elements, thereby maintaining the correspondence information in the latest state.

A content receiving device according to the present invention is a content receiving device configuring an information communication system having a server, a plurality of content holding devices holding content information including at least fragment content information as information into which a series of content information elements has been fragmented, and the content receiving device which receives the fragment content information by requesting the content information, the content receiving device including: a request information transmitting section which transmits request information as information requesting a series of content information elements to the server; a content information receiving section which receives a plurality of fragment content information elements, transmitted from the content holding devices, that are able to configure the series of content information elements requested in the request information transmitted by the request information transmitting section; and a content information accumulating section which accumulates the fragment content information elements received by the content information receiving section.

According to this configuration, the content receiving device only transmits request information requesting a desired series of content information elements to the server, thereby receiving a plurality of fragment content information elements configuring a series of content information elements according to the transmission of request information and easily acquiring the desired series of content information elements.

The content receiving device according to the present invention may further include: a content information configuring section which configures a series of content information elements from the plurality of fragment content information elements accumulated by the content information accumulating section, and the content information accumulating section may also accumulate the series of content information elements configured by the content information configuring section.

According to this configuration, a series of content information elements can be configured from a plurality of fragment content information.

Advantage of the Invention

According to an information communication system and the like by the present invention, the transmission of fragment content information can be easily requested even when a plurality of fragment content information elements are transmitted. A content receiving device can acquire a desired series of content information elements.

BRIEF DESCRIPTION OF THE DRAWINGS

FIG. 10 is a diagram showing an example of correspondence information according to the same embodiment.

FIG. 12 is a diagram showing an example of the correspondence of a device ID with an IP address according to the same embodiment.

FIG. 13 is a diagram showing an example of correspondence information according to the same embodiment.

FIG. 18 is a diagram showing an example of correspondence information in the same embodiment.

FIG. 19 is a diagram showing an example of correspondence information in the same embodiment.

FIG. 20 is a diagram showing an example of correspondence information in the same embodiment.

FIG. 21 is a diagram showing an example of correspondence information in the same embodiment.

DESCRIPTION OF REFERENCE NUMERALS AND SIGNS

Figure 1:
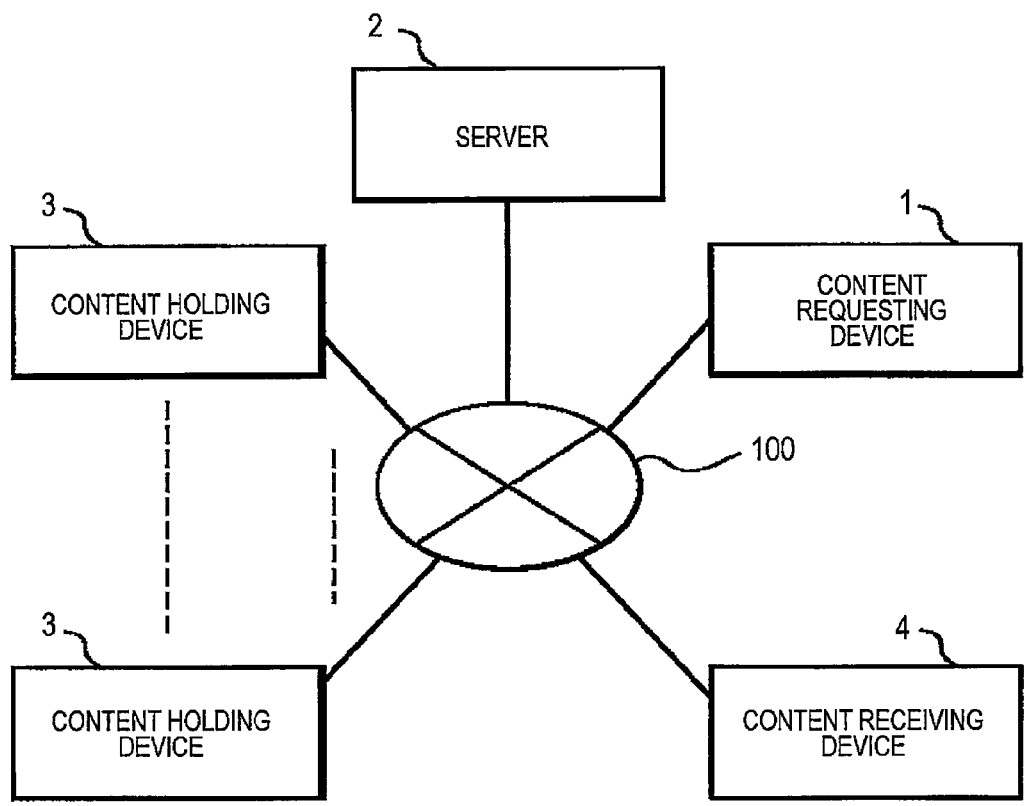
FIG. 1 is a block diagram showing a configuration of an information communication system according to an embodiment 1 of the present invention.

1: content requesting device
3, 6: content holding device
4, 8, 9: content receiving device
5, 7: server
11: request information receiving section
12: request information transmitting section
21: request information receiving section
22: correspondence information storing section
23, 51: specifying section
24, 82: instruction information transmitting section
25: change request information receiving section
26: correspondence information changing section
31: instruction information receiving section
32: content information storing section
33, 64: fragmentation section
34: content information transmitting section
35: content information acquiring section
36: change request information transmitting section
41: content information receiving section
42: content information accumulating section
43: content information configuring section
44: output section
52: specification request information receiving section
53: fragment specifying information configuring section
54: fragment specifying information transmitting section
61: deletion instruction receiving section
62: specification request information transmitting section
63: fragment specifying information receiving section
71: device specifying information transmitting section
81: device specifying information receiving section

BEST MODE FOR CARRYING OUT THE INVENTION

Hereinafter, an information communication system according to the present invention will be described using embodiments. In the following embodiments, components and steps denoted by the same reference numerals are the same or similar, and thus a description thereof may not be repeated.

(Embodiment 1)

An information communication system according to an embodiment 1 of the present invention will be described with reference to the drawings. In the information communication system according to this embodiment, content holding devices hold a series of content information elements, fragment the series of content information elements according to instruction information, and transmit the series of content information elements to a content receiving device.

FIG. 1 is a block diagram showing a configuration of the information communication system according to this embodiment. In FIG. 1, the information communication system according to this embodiment includes a content requesting device 1, a server 2, a plurality of content holding devices 3, and a content receiving device 4. The content requesting device 1, the server 2, the content holding devices 3, and the content receiving device 4, which are respectively connected through a wired or wireless communication link 100, can perform communication. For example, the communication link 100 is the Internet, the intranet, or the public telephone line network.

Figure 2:
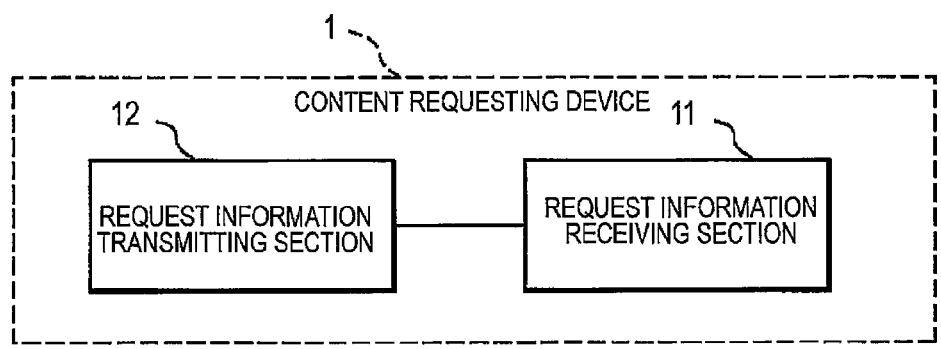
FIG. 2 is a block diagram showing a configuration of a content requesting device according to the same embodiment.

FIG. 2 is a block diagram showing a configuration of the content requesting device 1 according to this embodiment. In FIG. 2, the content requesting device 1 according to this embodiment includes a request information receiving section 11 and a request information transmitting section 12.

The request information receiving section 11 receives request information. Here, the request information is information requesting a series of content information. The series of content information elements is all information elements of video or audio, video and audio, still images, and other contents. The series of content information elements may be, for example, video and audio information of one episode of a drama broadcast (for example, video and audio information for about 1 hour), may be video and audio information of one movie, or may be information of a web page. The request information received by the request information receiving section 11 includes a series-of-content-information-elements ID as information for identifying the series of content information elements as a request target. The reception of the request information by the request information receiving section 11 may be the selection of one series-of-content-information-elements ID from a plurality of series-of-content-information-elements IDs.

Here, the reception may be that of information input from an input device (for example, a keyboard, a mouse, or a touch panel), may be that of information transmitted through a wired or wireless communication link, or may be that of information read from a predetermined recording medium (for example, an optical disk, a magnetic disk, a semiconductor memory, or the like). The request information receiving section 11 may or may not include a device for performing reception (for example, a modem, a network card, or the like). The request information receiving section 11 may be realized by hardware or may be realized by software such as a driver or like, which operates a predetermined device.

The request information transmitting section 12 transmits request information as information requesting a series of content information elements to the server 2. Request information received by the request information receiving section 11 may be the same as, or different from, request information transmitted by the request information transmitting section 12. In the latter case, for example, even when a requested series of content information elements may be the same between these request information elements, the format may be different therebetween. Information capable of being included in the request information transmitted by the request information transmitting section 12 is as follows.

(1) Series-of-content-information-elements ID (2) Information capable of specifying a destination of a content receiving device 4

Fragment content information included in a series of content information requested in the request information transmitted by the request information transmitting section 12 needs the above-described information (2) to be received by the content receiving device 4. The above-described information (2) is, for example, an address of the content receiving device 4 or identification information of the content receiving device 4 (for example, a device ID, an URL, or the like). In the latter case, it is assumed that information elements associated with the content receiving device 4 and the address of the content receiving device 4 exist separately. The content holding device 3 and the like can know the address of the content receiving device 4 by using the information.

As described below, the content requesting device 1 and the content receiving device 4 may be configured as an integrated device. In this case, the above-described information (2) may be a source address included in a header of a packet of the request information, that is, an address of the content receiving device 4 (the content requesting device 1).

The request information transmitting section 12 may hold an address of the server 2 or the like as a destination of the request information in a recording medium (not shown), or may acquire it from another component or another device upon transmission of the request information. The request information transmitting section 12 may directly transmit the request information to the server 2 or may transmit it through another server or the like.

The request information transmitting section 12 may or may not include a transmitting device for performing transmission (for example, a modem, a network card, or the like). The request information transmitting section 12 may be realized by hardware or may be realized by software such as a driver or like, which operates the transmitting device.

Figure 3:
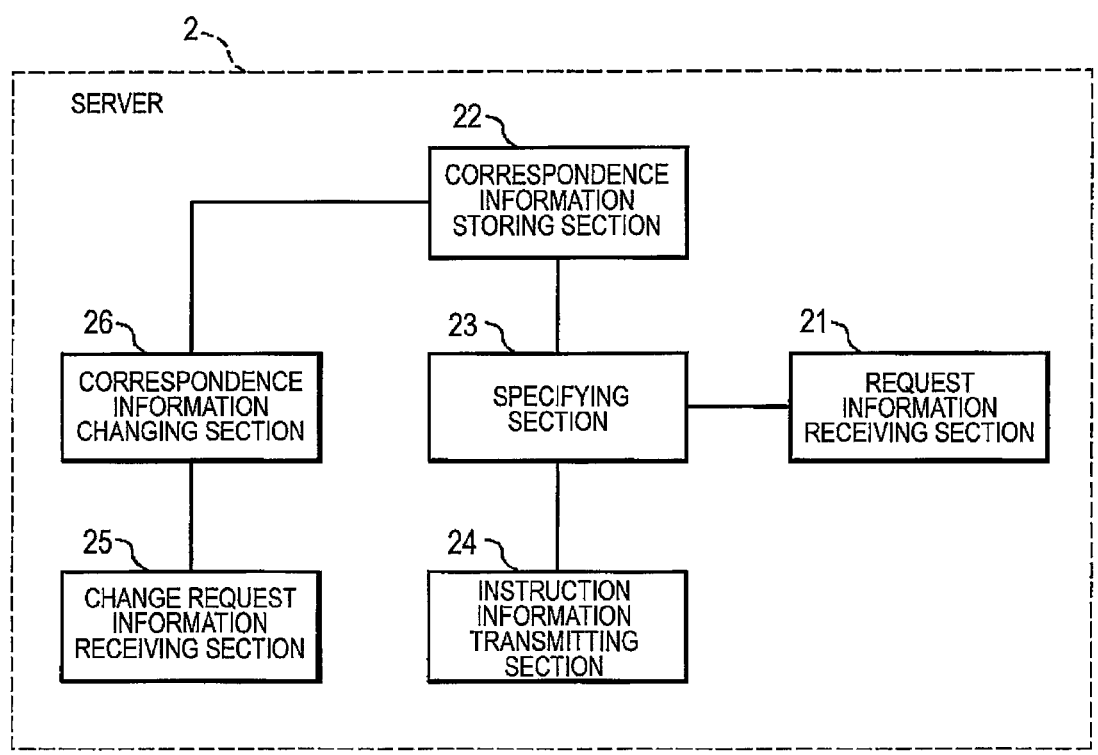
FIG. 3 is a block diagram showing a configuration of a server according to the same embodiment.

FIG. 3 is a block diagram showing a configuration of the server 2 according to this embodiment. In FIG. 3, the server 2 according to this embodiment includes a request information receiving section 21, a correspondence information storing section 22, a specifying section 23, an instruction information transmitting section 24, a change request information receiving section 25, and a correspondence information changing section 26.

In this embodiment, the case where the content requesting device 1 includes the request information receiving section 11 and the request information transmitting section 12 has been described, but the content requesting device 1 may not include the request information receiving section 11, for example, when the content requesting device 1 transmits preset request information at the predetermined timing.

The request information receiving section 21 receives the request information transmitted from the content requesting device 1. The request information receiving section 21 may or may not include a receiving device for performing reception (for example, a modem, a network card, or the like). The request information receiving section 21 may be realized by hardware or may be realized by software such as a driver or like, which operates the receiving device.

Correspondence information is stored in the correspondence information storing section 22. Here, the correspondence information is information indicating the correspondence of a plurality of content holding devices with content information including at least fragment content information held by each of the plurality of content holding devices. The fragment content information is information into which a series of content information elements has been fragmented. Accordingly, the fragment content information is information of part of the series of content information elements. The content information is a concept including all of the series of content information elements and the fragment content information. Since content information associated with the content holding devices 3 in the correspondence information includes at least fragment content information, it may be the fragment content information itself or may be a series of content information elements potentially including the fragment content information. In this embodiment, it is assumed that a series of content information elements is held in the content holding devices 3 and correspondence information is information indicating the correspondence of a plurality of content holding devices 3 with a series of content information elements held by each of the plurality of content holding devices 3. More specifically, the correspondence information may be information associated with the following information.

(1) Series-of-content-information-elements ID (2) Content holding device IDs

Here, the content holding device IDs are identification information of the content holding devices 3, which may be device IDs of the content holding devices 3, addresses of the content holding devices 3, or other information.

The correspondence information storing section 22 may be realized by a predetermined recording medium (for example, a semiconductor memory, a magnetic disk, an optical disk, or the like). A process in which the correspondence information is stored in the correspondence information storing section 22 is no object. For example, the correspondence information may be stored in the correspondence information storing section 22 through a recording medium, the correspondence information transmitted through a communication link or the like may be stored in the correspondence information storing section 22, or the correspondence information input through an input device may be stored in the correspondence information storing section 22. The correspondence information stored in the correspondence information storing section 22 is changed by a correspondence information changing section 26 to be described later.

The specifying section 23 specifies one or more content holding devices 3 and a plurality of fragment content information elements included at least in content information held by the one or more content holding devices 3 using the correspondence information. The specifying section 23 specifies a content holding device 3 and fragment content information included in content information held by the content holding device 3 so that a series of content information elements requested in the request information received by the request information receiving section 21 can be configured by the specified plurality of fragment content information elements. In the case where a series of content information elements can be configured by a plurality of fragment content information elements, a sum of a plurality of fragment content information elements may exactly match the series of content information elements or the sum of the plurality of fragment content information elements may be greater than the series of content information elements since a redundant part exists in the plurality of fragment content information elements. Even in the latter case, the series of content information elements can be properly configured by deleting the redundant part. In this embodiment, the former case will be described.

In this embodiment, since a series of content information elements is held in content holding devices 3 and the transmission of fragment content information included in the series of content information elements can be requested, the specifying section 23 specifies all or part of the content holding devices 3 holding the series of content information elements requested in the request information and assigns associated fragment content information to the specified content holding devices 3.

The specifying section 23 may specify one content holding device 3 and specify two or more fragment content information elements held by the content holding device 3. In this embodiment, the case where the specifying section 23 specifies a plurality of content holding devices 3 and a plurality of fragment content information elements included at least in content information held by the plurality of content holding devices 3 will be described.

In the case of specifying a content holding device 3, for example, a content holding device ID may be accumulated in a recording medium or the like, a flag associated with the content holding device ID may be set, and any method capable of specifying a content holding device 3 is possible without limitation. In the case of specifying fragment content information, for example, information capable of specifying a position of fragment content information in a series of content information elements may be accumulated in a recording medium or the like, a flag or the like associated with the position of the fragment content information in the series of content information elements may be set, and any method capable of specifying fragment content information in a series of content information elements is possible without limitation. Here, information capable of specifying a position of fragment content information in a series of content information elements may be, for example, information indicating the start and end positions of the fragment content information in the series of content information elements (for example, 512th to 1024th bytes of the series of content information elements, 10th to 15th frames of the series of content information elements when the series of content information elements are moving pictures, or the like), or may be information indicating a sequence of fragment content information (for example, a third fragment content information element of the series of content information elements or the like) when a rule of fragmenting the series of content information elements is predefined. The specifying section 23 can configure fragment specifying information as information for specifying fragment content information included in a series of content information elements held by specified content holding devices 3. The fragment specifying information may include a series-of-content-information-elements ID as identification information of the series of content information elements. The fragment content information included in the series of content information elements is specified by the series-of-content-information-elements ID included in the fragment specifying information.

The specifying section 23 may respectively specify content holding devices 3 holding the series of content information elements requested in request information and fragment content information elements into which a series of content information elements has been fragmented by the number of content holding devices 3 holding the series of content information elements. For example, when 10 content holding devices 3 hold the series of content information elements requested in the request information, the specifying section 23 may respectively specify the 10 content holding devices 3 and 10 fragmented fragment content information elements. An upper limit of the number of fragmentations may be set.

When the number of fragmentations is very large, fragment content information is transmitted from many content holding devices 3 to the content receiving device 4 and cases of inefficiency also occur. When a series of content information elements is held by content holding devices 3 whose number is greater than the upper limit since the upper limit of the number of fragmentations is set, the series of content information elements may be fragmented by the upper limit of the number of fragmentations and content holding devices 3 whose number corresponds to the upper limit may be selected and specified. The number of fragmentations may be less than the number of content holding devices 3 holding the series of content information elements requested in the request information or may be in accordance with a preset rule (for example, a multiple of 10 or the like).

The specifying section 23 may specify content holding devices 3 and fragment content information so that fragmentation into a preset size of fragment content information is performed. For example, when a size of one fragment content information element is set to 256 bytes and a size of a series of content information elements requested in request information is 1500 bytes, the specifying section 23 may respectively specify 6 content holding devices 3 holding the series of content information elements and 6 fragment content information elements each having 256 bytes from the start of a series of content elements. In this case, the last fragment content information has a size of less than 256 bytes. However, the last fragment content information may have a size of less than 256 bytes or may have a size of 256 bytes by adding extra information (for example, dummy information).

When the specifying section 23 selects and specifies a predetermined number of content holding devices 3 from a plurality of content holding devices 3 holding the same series of content information elements, the selection may be as follows. For example, the specifying section 23 may preferentially select a content holding device 3 capable of being considered to be closer to the content receiving device 4. For example, a distance between the content holding device 3 and the content receiving device 4 may be a physical distance or the number of routers (hops) present between the two devices. For example, the specifying section 23 may preferentially select a content holding device 3 having a wide communication band between the content holding devices 3 and the content receiving device 4. For example, the specifying section 23 may preferentially select a content holding device 2 having high processing capability. For example, the specifying section 23 may select a content holding device 3 holding a high-quality series of content information elements in preferred technology even in the case of the same series of content information elements. Here, for example, the quality is a bit rate of music or video, the number of bits of quantization, a frequency of quantization, or the like. For example, the specifying section 23 may register a cooperative content holding device 3 for the transmission of fragment content information and preferentially select the registered cooperative content holding device 3. When this selection is performed, the specifying section 23 may ask the content holding device 3 or the content receiving device 4 about the communication band, the processing capability, or the quality of a series of content information elements held or may hold in advance information thereof.

The specification of a content holding device 3 and fragment content information held in the content holding device 3 by the specifying section 23 is not limited to the above-described method, and of course other methods are possible as long as proper specification can be performed.

The instruction information transmitting section 24 transmits instruction information to a content holding device 3 specified by the specifying section 23. Here, the instruction information is information instructing that fragment content information specified by the specifying section 23 be transmitted to the content receiving device 4. Information capable of being included in the instruction information transmitted by the instruction information transmitting section 24 is as follows.

(1) Information capable of specifying a destination of the content receiving device 4

(2) Fragment specifying information

The above-described fragment specifying information (2) may be information including only a series-of-content-information-elements ID. For example, it is assumed that a fragmentation rule of a series of content information elements is preset and fragment content information assigned to each content holding device 3 is regularly set. In this case, since fragment content information may also be specified only by specifying the series of content information elements, only the series-of-content-information-elements ID as the information specifying the series of content information elements may be included in the fragment specifying information. Here, the fragmentation rule of the series of content information elements is, for example, that the series of content information elements are fragmented into 10 equal parts. A rule of fragment content information assigned to each content holding device 3 is that in which fragment content information of a sequence indicated by the last digit of a device ID is an assigned division when the device ID of each content holding device 3 is indicated by a decimal number. Specifically, an assigned division for a content holding device 3 of a device ID "123" becomes a third fragment content information element among fragment content information elements fragmented into 10 equal parts. In this case, when only one of a series of content information elements is held in the content holding device 3, the above-described fragment specifying information (2) may not be included in the instruction information. This is because it is possible to uniquely specify a series of content information elements without fragment specifying information.

When the instruction information transmitting section 24 transmits instruction information elements to each of a plurality of content holding devices 3, instruction information elements may be all the same or all different. In the former case, for example, a device ID by which a content holding device 3 is identified is associated with fragment specifying information in the instruction information, and the content holding device 3 receiving the instruction information may transmit fragment content information using fragment specifying information corresponding to a device ID of a local device. The instruction information transmitting section 24 may directly transmit the instruction information to one or more content holding devices 3 or may transmit the instruction information through another server or the like.

The instruction information transmitting section 24 may or may not include a transmitting device for performing transmission (for example, a modem, a network card, or the like). The instruction information transmitting section 24 may be realized by hardware or may be realized by software such as a driver or like, which operates the transmitting device.

The change request information receiving section 25 receives change request information. Here, the change request information is information requesting a change of correspondence information according to acquisition of a series of content information elements from a content holding device 3 described later. Information capable of being included in the change request information is as follows.

(1) Information capable of specifying a content holding device 3

(2) Series-of-content-information-elements ID

The above-described information (1) may be a source address included in a header of a packet of the change request information, that is, an address of the content holding device 3. A change of correspondence information according to deletion of a series of content information elements may be requested in the change request information. In this case, the change request information may include information indicating whether a series of content information elements has been acquired or deleted.

The change request information receiving section 25 may or may not include a receiving device for performing reception (for example, a modem, a network card, or the like). The change request information receiving section 25 may be realized by hardware or may be realized by software such as a driver or like, which operates the receiving device.

The correspondence information changing section 26 changes correspondence information stored in the correspondence information storing section 22 according to change request information received by the change request information receiving section 25. When information capable of specifying a content holding device 3 and a series-of-content-information-elements ID are included in the change request information, the correspondence information changing section 26 may create, for example, a record in which the series-of-content-information-elements ID is associated with content holding device IDs using the above-described information and add the created record to the correspondence information. When the change request information receiving section 25 has received change request information indicating that a series of content information elements has been deleted, the correspondence information changing section 26, for example, may retrieve a record corresponding to information capable of specifying a content holding device 3 included in the change request information and a series-of-content-information-elements ID from the correspondence information to delete the retrieved record or may set a flag or the like indicating that the record is invalid.

Figure 4:
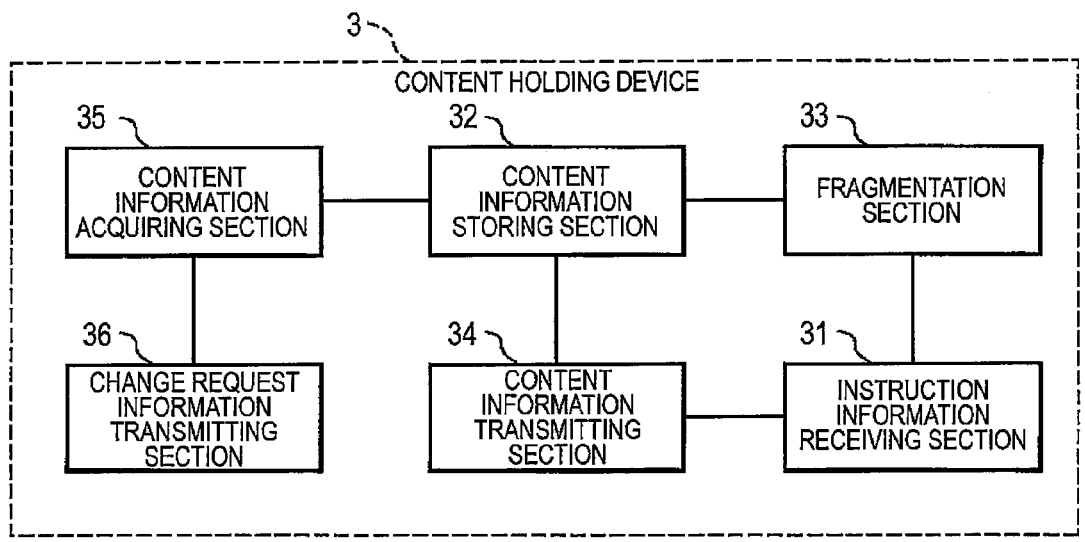
FIG. 4 is a block diagram showing a configuration of a content holding device according to the same embodiment.

FIG. 4 is a block diagram showing a configuration of the content holding device 3 according to this embodiment. The content holding device 3 according to this embodiment includes an instruction information receiving section 31, a content information storing section 32, a fragmentation section 33, a content information transmitting section 34, a content information acquiring section 35, and a change request information transmitting section 36.

The instruction information receiving section 31 receives instruction information. The instruction information is transmitted from the server 2 and is information instructing that fragment content information be transmitted to the content receiving device 4. The instruction information may include information capable of specifying a destination of the content receiving device 4 or fragment specifying information as information for specifying fragment content information included in a series of content information elements held by specified content holding devices 3 as described above.

The instruction information receiving section 31 may or may not include a receiving device for performing reception (for example, a modem, a network card, or the like). The instruction information receiving section 31 may be realized by hardware or may be realized by software such as a driver or like, which operates the receiving device.

Content information including at least fragment content information is stored in the content information storing section 32. In this embodiment, it is assumed that the content information storing section 32 stores at least a series of content information elements.

The content information storing section 32 may be realized by a predetermined recording medium (for example, a semiconductor memory, a magnetic disk, an optical disk, or the like). A process in which content information is stored in the content information storing section 32 is no object. For example, the content information may be stored in the content information storing section 32 through a recording medium, the content information transmitted through a communication link or the like may be stored in the content information storing section 32, or the content information input through an input device may be stored in the content information storing section 32. Content information acquired by the content information acquiring section 35 is stored in the content information storing section 32 as described later.

The fragmentation section 33 generates fragment content information by fragmenting a series of content information elements stored in the content information storing section 32 and accumulates the fragment content information in the content information storing section 32. When fragment specifying information is included in the instruction information, the fragmentation section 33 may fragment a series of content information elements using the fragment specifying information and generate fragment content information specified by the fragment specifying information. As described above, when a fragmentation rule is predefined and an associated fragmentation part is defined for every content holding device 3, the fragmentation section 33 may generate fragment content information according to the rule. In this case, fragmentation may be performed before reception of the instruction information. This is because the fragmentation may be performed without fragment specifying information.

In the content information storing section 32, an area where a series of content information elements is stored and an area where fragment content information generated by the fragmentation section 33 is stored may be configured by the same physical recording medium or may be configured by different recording media. In the latter case, for example, a series of content information elements may be stored in a hard disk to perform long-term storage, while fragment content information may be stored in a RAM or the like to perform temporary storage.

The content information transmitting section 34 reads fragment content information indicated by instruction information received by the instruction receiving section 31 from the content information storing section 32 and transmits the fragment content information to the content receiving device 4. It is assumed that information capable of specifying a destination of the content receiving device 4 is included in the instruction information as described above, and the content information transmitting section 34 sets an address of the content receiving device 4 as a destination of the fragment content information using the information. The content information transmitting section 34 may directly transmit the fragment content information to the content receiving device 4 or may transmit the fragment content information through another server or the like.

The content information transmitting section 34 may transmit fragment content information, a series-of-content-information-elements ID, and information indicating a fragment position to the content receiving device 4. This enables the content receiving device 4 to configure a series of content information elements on the basis of such information.

The content information transmitting section 34 may or may not include a transmitting device for performing transmission (for example, a modem, a network card, or the like). The content information transmitting section 34 may be realized by hardware or may be realized by software such as a driver or like, which operates the transmitting device.

The content information acquiring section 35 acquires a series of content information elements and accumulates the series of content information elements in the content information storing section 32. A method in which the content information acquiring section 35 acquires a series of content information elements is no object. For example, acquisition may be made by receiving and recording a series of content information elements broadcast by a wired link or a wireless link, acquisition may be made by receiving and recording a series of content information elements transmitted through a wired or wireless communication link, acquisition may be made by reading from a recording medium recording a series of content information elements, or acquisition may be made according to other methods.

In the case where the content information acquiring section 35 receives a series of content information elements, the content information acquiring section 35 may or may not include a device for performing reception (for example, a receiving device). The content information acquiring section 35 may be realized by hardware or may be realized by software such as a driver or like, which operates a device to receive a series of content information elements.

The change request information transmitting section 36 transmits change request information to the server 2. As described above, the change request information is information requesting a change according to acquisition of a series of content information elements by the content information acquiring section 35 for correspondence information held by the server 2. The change request information transmitting section 36 transmits change request information when a new series of content information elements, which has not yet been stored in the content information storing section 32, has been acquired, and does not transmit change request information when a series of content information elements already stored in the content information storing section 32 has been acquired.

The change request information transmitting section 36 may hold an address of the server 2 or the like as a destination of change request information in a recording medium (not shown), or may acquire the address or the like from another component or another device upon transmission of change request information. The change request information transmitting section 36 may directly transmit the change request information to the server 2 or may transmit the change request information through another server or the like.

The change request information transmitting section 36 may or may not include a transmitting device for performing transmission (for example, a modem, a network card, or the like). The change request information transmitting section 36 may be realized by hardware or may be realized by software such as a driver or like, which operates the transmitting device.

Although not shown in FIG. 4, the content holding device 3 may have an output section, which outputs content information stored in the content information storing section 32. The output section may be the same as an output section 44 of the content receiving device 4 described later.

Figure 5:
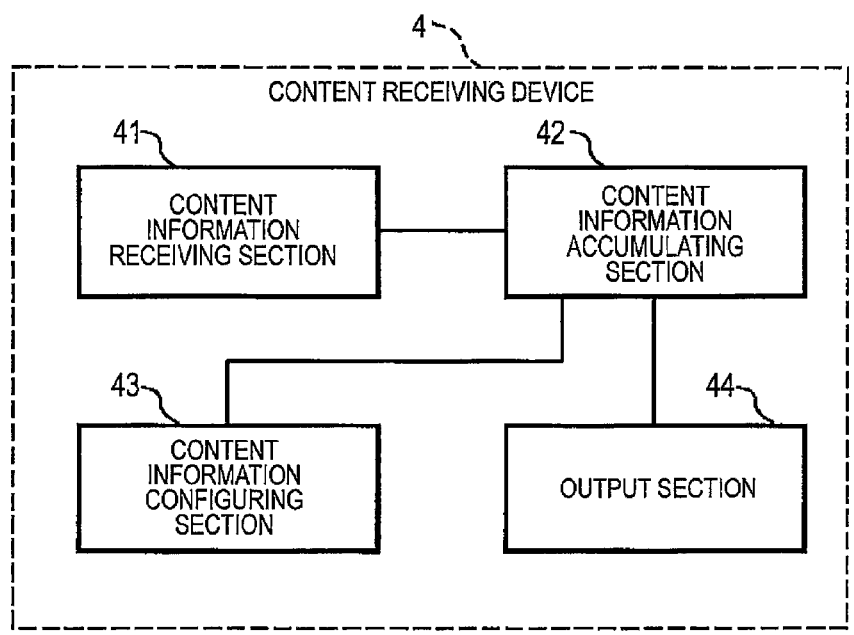
FIG. 5 is a block diagram showing a configuration of a content receiving device according to the same embodiment.

FIG. 5 is a block diagram showing a configuration of the content receiving device 4 according to this embodiment. In FIG. 5, the content receiving device 4 according to this embodiment includes a content information receiving section

41, a content information accumulating section 42, a content information configuring section 43, and the output section 44.

The content information receiving section 41 receives a plurality of fragment content information elements transmitted from one or more content holding devices 3. The plurality of fragment content information elements can configure a series of content information elements requested in request information transmitted from the content requesting device 1.

The content information receiving section 41 may or may not include a receiving device for performing reception (for example, a modem, a network card, or the like). The content information receiving section 41 may be realized by hardware or may be realized by software such as a driver or like, which operates the receiving device.

The content information accumulating section 42 respectively accumulates a plurality of fragment content information elements received by the content information receiving section 41 in a predetermined recording medium. The recording medium, for example, may be a semiconductor memory, an optical disk, a magnetic disk, or the like, may be provided in the content information accumulating section 42, or may exist outside the content information accumulating section 42. This recording medium may or may not temporarily store fragment content information.

The content information accumulating section 42 may also accumulate the series of content information elements configured by the content information configuring section 43 in a predetermined recording medium as described later. In this case, in the predetermined recording medium, an area where fragment content information is stored and an area where a series of content information elements is stored may be configured by the same physical recording medium or may be configured by different recording media. In the latter case, for example, a series of content information elements may be stored in a hard disk to perform long-term storage, while fragment content information may be stored in a RAM or the like to perform temporary storage.

The content information configuring section 43 may configure a series of content information elements from a plurality of fragment content information elements accumulated by the content information accumulating section 42. For example, a series of content information elements of one file may be configured by sequentially integrating fragment content information as a plurality of files. It is assumed that the series of content information elements configured by the content information configuring section 43 are accumulated by the content information accumulating section 42 as described above.

When a redundant part exists in the plurality of fragment content information elements received by the content information receiving section 41, the content information configuring section 43 may configure a series of content information elements without redundancy by deleting the redundant part from any one fragment content information element.

In the case where the content information receiving section 41 receives a series-of-content-information-elements ID or information indicating a fragment position along with fragment content information from the content holding device 3, the content information configuring section 43 may use such information when configuring a series of content information elements. For example, the content information configuring section 43 may configure a series of content information elements by sequentially connecting fragment content information corresponding to the same series-of-content-information-elements ID from the start to the end of the series of content information elements according to information indicating fragment positions. When the content information receiving section 41 does not receive a series-of-content-information-elements ID or information indicating a fragment position, the content information configuring section 43 may configure a series of content information elements using information included in fragment content information. For example, when a time code, a frame number, or the like is included in the fragment content information, the content information configuring section 43 may configure a series of content information elements from fragment content information using such information. For example, the content information configuring section 43 may configure a series of content information elements by determining whether the video/audio of the end of a fragment content information element is cleanly connected to that of the start of another fragment content information element (for example, it may be determined that a connection is cleanly made when the two elements are successively connected). For example, when the two elements are cleanly connected, it is determined that the two fragment content information elements are adjacent. Otherwise, the same determination may be performed for other two fragment content information elements.

When a plurality of fragment content information elements can be used as a series of content information elements without configuring the series of content information elements, the content information configuring section 43 may not configure the series of content information elements. For example, a series of content information elements of a drama is divided into a first fragment content information element corresponding to a first part of the drama, a second fragment content information element corresponding to a second part of the drama, and a third fragment content information element corresponding to a third part of the drama. An operation of sequentially reproducing the first to third fragment content information elements when each fragment content information element can be reproduced is the same as that of configuring and reproducing a series of content information elements. Accordingly, in this case, the configuration of the series of content information elements may not be performed. When the configuration of the series of content information elements may not be performed by the content information configuring section 43, the content information accumulating section 42 accumulates all fragment content information elements into which a series of content information elements has been fragmented, thereby acquiring the series of content information elements. When the configuration of the series of content information elements may not be performed, the content receiving device 4 may not have the content information configuring section 43.

The output section 44 outputs a series of content information elements accumulated by the content information accumulating section 42. Here, for example, the output may be made by reproducing and displaying the series of content information elements on a display device (for example, a CRT, a liquid crystal display, or the like), may be made by transmitting the series of content information elements to a predetermined device through a communication link, may be made by printing the series of content information elements by a printer, may be made by audio output of the series of content information elements by a speaker, or may be made by accumulating the series of content information elements in a recording medium. The output section 44 may or may not include a device for performing output (for example, a display device, a printer, or the like). The output section 44 may be realized by hardware or may be realized by software such as a driver or like, which operates the device.

Next, the operation of the content requesting device 1 according to this embodiment will be described using the flowchart of FIG. 6.

(Step S101) The request information receiving section 11 determines whether request information has been received. When the request information has been received, it proceeds to step S102. Otherwise, a process of step S101 is repeated until the request information is received.

(Step S102) The request information transmitting section 12 transmits the request information to the server 2. It returns to step S101.

Figure 6:
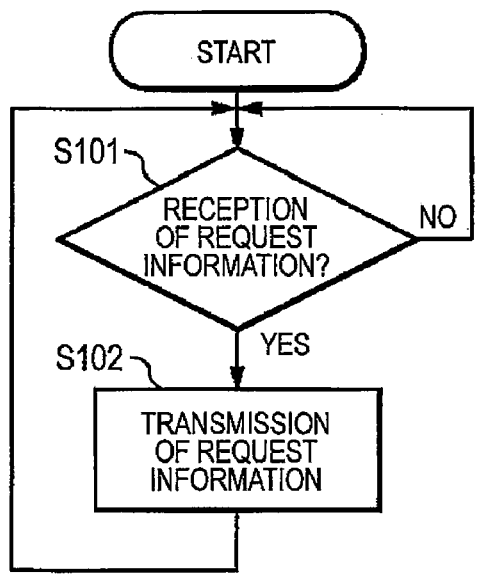
FIG. 6 is a flowchart showing an operation of the content requesting device according to the same embodiment.

In the flowchart of FIG. 6, the process is terminated by the interruption of power off and process termination.

Next, the operation of the server 2 according to this embodiment will be described using the flowchart of FIG. 7.

(Step S201) The request information receiving section 21 determines whether request information has been received. When the request information has been received, it proceeds to step S202. Otherwise, it proceeds to step S204.

(Step S202) The specifying section 23 specifies one or more content holding devices 3 and a plurality of fragment content information elements using correspondence information stored in the correspondence information storing section 22 so that a series of content information elements requested in the request information received by the request information receiving section 21 can be configured.

(Step S203) The instruction information transmitting section 24 transmits instruction information, instructing that fragment content information specified by the specifying section 23 be transmitted, to one or more content holding devices 3 specified by the specifying section 23. Then, it returns to step S201.

(Step S204) The change request information receiving section 25 determines whether change request information has been received. When the change request information has been received, it proceeds to step S205. Otherwise, it returns to step S201.

(Step S205) The correspondence information changing section 26 changes correspondence information stored in the correspondence information storing section 22 according to the change request information received by the change request information receiving section 25. Then, it returns to step S201.

Figure 7:
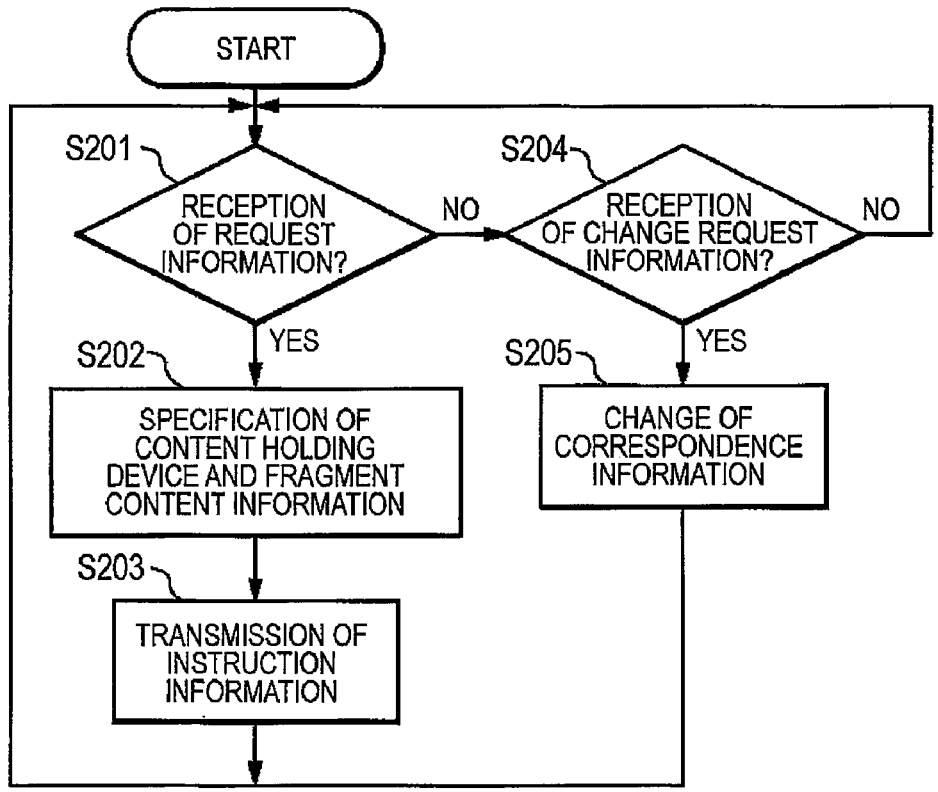
FIG. 7 is a flowchart showing an operation of the server according to the same embodiment.

In the flowchart of FIG. 7, the process is terminated by the interruption of power off and process termination.

Next, the operation of the content holding device 3 according to this embodiment will be described using the flowchart of FIG. 8.

(Step S301) The instruction information receiving section 31 determines whether instruction information has been received. When the instruction information has been received, it proceeds to step S302. Otherwise, it proceeds to step S304.

(Step S302) The fragmentation section 33 fragments a series of content information elements stored in the content information storing section 32 according to the instruction information received by the instruction information receiving section 31, generates fragment content information, and accumulates the fragment content information in the content information storing section 32.

(Step S303) The content information transmitting section 34 reads the fragment content information generated by the fragmentation section 33 from the content information storing section 32 and transmits the fragment content information to the content receiving device 4. Then, it returns to step S301.

(Step S304) The content information acquiring section 35 determines whether it is the timing to acquire a series of content information elements. When it is the timing to acquire the series of content information elements, it proceeds to step S305. Otherwise, it proceeds to step S305. For example, a recording reservation regarding the series of content information elements is made. When the recording time has been reached, the content information acquiring section 35 may determine that it is the timing to acquire the series of content information elements. When an instruction indicating that the series of content information elements should be acquired has been input to the content holding device 3, the content information acquiring section 35 may determine that it is the timing to acquire the series of content information elements.

(Step S305) The content information acquiring section 35 acquires the series of content information elements.

(Step S306) The content information acquiring section 35 accumulates the acquired series of content information elements in the content information storing section 32.

(Step S307) The change request information transmitting section 36 transmits change request information to the server 2 according to acquisition of a series of content information elements by the content information acquiring section 35. Then, it returns to step S301.

Figure 8:
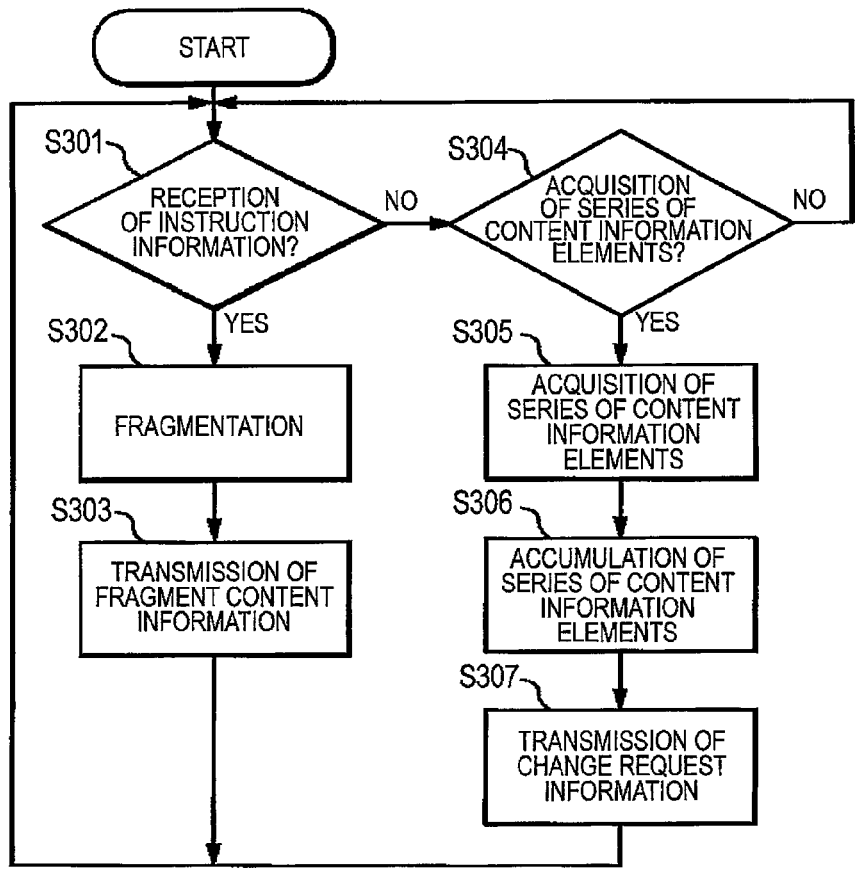
FIG. 8 is a flowchart showing an operation of the content holding device according to the same embodiment.

In the flowchart of FIG. 8, the process is terminated by the interruption of power off and process termination.

Next, the operation of the content receiving device 4 according to this embodiment will be described using the flowchart of FIG. 9.

(Step S401) The content information receiving section 41 determines whether fragment content information has been received. When the reception has been made, it proceeds to step S402. Otherwise, it proceeds to step S403.

(Step S402) The content information accumulating section 42 accumulates fragment content information received by the content information receiving section 41 in a predetermined recording medium. Then, it returns to step S401.

(Step S403) The content information configuring section 43 determines whether it is the timing to configure a series of content information. When it is the timing to configure the series of content information elements, it proceeds to step S404. Otherwise, it proceeds to step S406. For example, when fragment content information capable of configuring a series of content information elements has been accumulated by the content information accumulating section 42, the content information configuring section 43 may determine that it is the timing to configure the series of content information elements.

(Step S404) The content information configuring section 43 configures the series of content information elements using a plurality of fragment content information elements accumulated by the content information accumulating section 42.

(Step S405) The content information accumulating section 42 accumulates the series of content information elements configured by the content information configuring section 43 in a predetermined recording medium. Then, it returns to step S401.

(Step S406) The output section 44 determines whether it is the timing to output the series of content information elements. When it is the timing to output the series of content information elements, it proceeds to step S407. Otherwise, it returns to step S401. For example, the output section 44 may determine that it is the timing to output the series of content information elements when an instruction indicating that the series of content information elements should be output has been input to the content receiving device 4, or may determine that it is the timing to output the series of content information elements when an output reservation regarding the series of content information elements has been made and the output time has been reached.

(Step S407) The output section 44 reads a series of content information elements from a predetermined recording medium in which the content information accumulating section 42 has accumulated the series of content information elements, and outputs the series of content information elements. Then, it returns to step S401.

Figure 9:
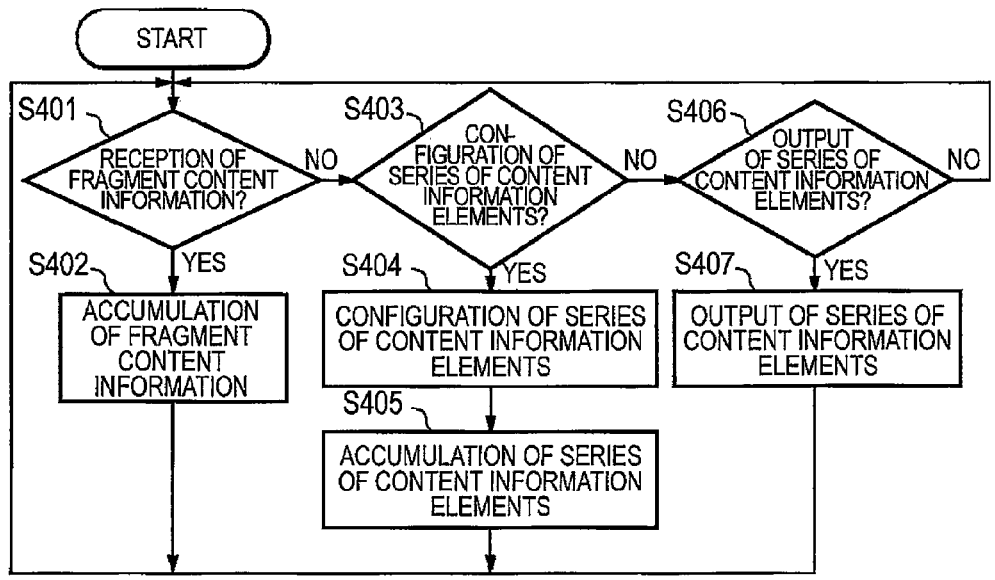
FIG. 9 is a flowchart showing an operation of the content receiving device according to the same embodiment.

In the flowchart of FIG. 9, the process is terminated by the interruption of power off and process termination.

Next, the operation of the information communication system according to this embodiment will be described using a specific example.

In the specific example, it is assumed that the content requesting device 1 is a portable phone, and the content holding device 3 and the content receiving device 4 connected to a display is hard disk recording and playback equipment capable of outputting content information to the display, transmitting/receiving the content information, or accumulating the content information in a hard disk.

It is assumed that correspondence information shown in FIG. 10 is stored in the correspondence information storing section 22 of the server 2. In the correspondence information of FIG. 10, a series-of-content-information-elements ID is associated with content holding device IDs. For example, it is found that a series of content information elements identified by a series-of-content-information-elements ID "FC001" is respectively held by content holding devices 3 identified by content holding device IDs "A001", "A002", "A003" and "A004" from the correspondence information of FIG. 10. The series of content information elements identified by the series-of-content-information-elements ID "FC001" may be referred to as the series of content information elements "FC001". It is assumed that this is the same for other content information elements or content holding devices 3.

First, it is assumed that a user desires to watch the series of content information elements "FC001" by hard disk recording and playback equipment at home. The user operates the content requesting device 1 as the portable phone and inputs an instruction to watch the series of content information elements "FC001". Then, the instruction is received by the content requesting device 1 (step S101) and the request information transmitting section 12 configures a packet of request information including the series-of-content-information-elements ID "FC001" and an ID "A101" of the content receiving device 4 registered in advance in the content requesting device 1 and transmits the packet including the request information to an address of the server 2 registered in advance (step S102).

The packet of the request information transmitted from the content requesting device 1 is received by the request information receiving section 21 of the server 2 (step S201). The request information receiving section 21 passes the ID "A101" of the content receiving device 4 included in the request information to the instruction information transmitting section 24 by a path (not shown) and passes the series-of-content-information-elements ID "FC001" included in the request information to the specifying section 23.

Figure 11:
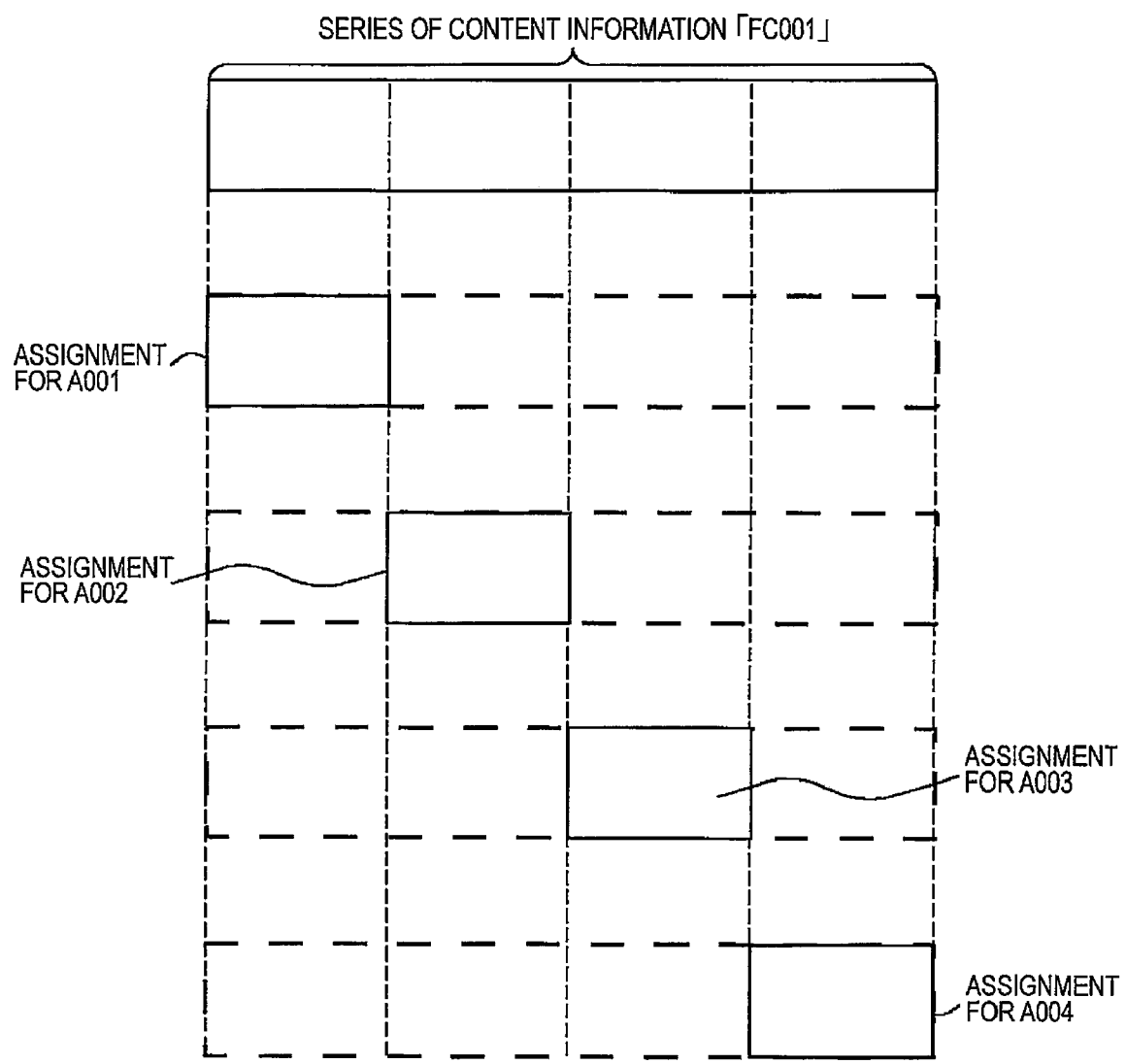
FIG. 11 is a diagram showing an example of fragmentation of a series of content information elements according to the same embodiment.

The specifying section 23 refers to the correspondence information of FIG. 10 stored in the correspondence information storing section 22 and determines to fragment the series of content information elements into 4 fragment content information elements since the number of content holding devices 3 holding the series of content information elements "FC001" received from the request information receiving section 21 is 4. The specifying section 23 specifies each content holding device 3 and fragment content information assigned to each content holding device 3 as shown in FIG. 11 (step S202). Specifically, the specifying section 23 configures fragment specifying information corresponding to each content holding device 3. The fragment specifying information includes the series-of-content-information-elements ID "FC001" and the start and end positions of fragment content information assigned to each content holding device 3. For example, the following fragment specifying information is configured as that assigned to the content holding device "A001".

[Fragment specifying information of the content holding device "A001"]

Series-of-content-information-elements ID: FC001

Start position of the fragment content information: 1st byte

End position of the fragment content information: 5000th byte

Information indicating that fragment content information is the end, for example, an end flag or the like may be set in fragment specifying information of fragment content information corresponding to the end of a series of content information elements. In a specific example, it is assumed that the end flag is set in fragment specifying information of the content holding device "A004".

The specifying section 23 configures fragment specifying information for each of content holding devices "A001", "A002", "A003", and "A004", and respectively passes the fragment specifying information and corresponding content holding device IDs to the instruction information transmitting section 24. Then, the instruction information transmitting section 24 accesses information associated with a device ID and an IP address shown in FIG. 12, acquires an IP address "100.200.100.101" corresponding to an ID "A101" of the content receiving device 4, configures a packet of instruction information including the IP address and the fragment specifying information, and transmits the configured instruction information packet to a content holding device 3 corresponding to the instruction information (step S203).

Specifically, when the instruction information packet is transmitted to the content holding device "A001", the instruction information transmitting section 24 accesses information associated with a device ID and an IP address shown in FIG. 12, and acquires an IP address "100.100.100.101" corresponding to the content holding device "A001". Then, the instruction information packet is transmitted to the IP address. Likewise, the instruction information transmitting section 24 transmits corresponding instruction information packets to the other holding devices "A002", "A003", and "A004".

In FIG. 12, only IP addresses are shown, but IP addresses and port numbers may be associated with device IDs. It is desirable for each content holding device 3 and the content receiving device 4 to again register a changed IP address in the server 2 when the IP address has been changed so that the information shown in FIG. 12 is maintained in the latest state.

Next, the case where the content holding device "A001" transmits fragment content information to the content receiving device 4 will be described. A packet of instruction information transmitted from the server 2 is received by the instruction information receiving section 31 of the content holding device "A001" (step S301). Then, the instruction information receiving section 31 passes an IP address of the content receiving device 4 and fragment specifying information included in the instruction information to the content information transmitting section 34. The fragment specifying information is passed to the fragmentation section 33.

The fragmentation section 33 creates fragment content information from the series of content information elements "FC001" stored in the content information storing section 32 according to the received fragment specifying information (step S302). Specifically, the fragmentation section 33 fragments the series of content information elements "FC001" as shown in FIG. 11, creates fragment content information assigned to the content holding device "A001", and accumulates the fragment content information in the content information storing section 32.

The content information transmitting section 34 reads the fragment content information created by the fragmentation section 33 and accumulated in the content information storing section 32 and configures a packet including the fragment content information and fragment specifying information. The content information transmitting section 34 transmits the packet including the fragment content information using an IP address of the content receiving device 4 received from the instruction information receiving section 31 as a destination (step S303). After transmitting the packet, the fragment content information stored in the content information storing section 32 may be deleted.

A packet including fragment content information transmitted from the content holding device "A001" is received by the content information receiving section 41 of the content receiving device 4 (step S401), and the content information accumulating section 42 accumulates the fragment content information and fragment specifying information in a hard disk (step S402).

In the same way, fragment content information is transmitted from the content holding devices "A002", "A003", and "A004" other than the content holding device "A001" and is accumulated by the content information accumulating section 42.

The content information configuring section 43 determines whether a series of content information elements can be configured by referring to fragment content information accumulated by the content information accumulating section 42 and fragment specifying information associated therewith. Specifically, the content information configuring section 43 refers to fragment specifying information accumulated by the content information accumulating section 42 and determines whether the start to the end of the series of content information elements can be configured by fragment content information corresponding to the fragment specifying information. When the start to the end of the series of content information elements can be configured, it is determined to be the timing to configure the series of content information elements (step S403), and the content information configuring section 43 configures the series of content information elements in which a plurality of fragment content information elements have been combined in a sequence indicated by the fragment specifying information (step S404). The content information accumulating section 42 accumulates the configured series of content information elements in a hard disk (step S405). Then, when an instruction to output the series of content information elements has been input from the user to the content receiving device 4 (step S406), the output section 44 reads the series of content information elements from the hard disk and outputs the series of content information elements to a display (step S407). Consequently, the user can watch the series of content information elements.

Next, an operation in which a series of content information elements is acquired from the content holding devices 3 and correspondence information is changed will be described. It is assumed that a recording reservation of the series of content information elements "FC101" is performed in the content holding device "A001". Then, when a broadcast time of the series of content information elements is reached, the content information acquiring section 35 determines that it is the timing to start the recording of the series of content information elements "FC101" (step S304), and records the series of content information elements (steps S305 and S306). Then, when the recording ends, the change request information transmitting section 36 reads the content holding device ID "A001" of the content holding device 3 from a recording medium (not shown), configures a packet of change request information including the content holding device 3 and the series-of-content-information-elements ID "FC101" of the recorded series of content information elements, and transmits the packet to an address of the server 2 registered in advance (step S307).

The packet of the change request information is received by the change request information receiving section 25 of the server 2 (step S204). Then, the change request information receiving section 25 adds the correspondence of the received series-of-content-information-elements ID "FC101" with the content holding device ID "A001" to the correspondence information (step S205). As a result, the correspondence information is shown in FIG. 13. Likewise, change request information is received from other content holding devices 3 and the correspondence information is changed in the server 2 according to the change request information.

In this specific example, the content holding device 3 and the content receiving device 4 have been separately described, but the content holding device 3 and the content receiving device 4 may be the same. For example, the content information acquiring section 35 of the content holding device 3 may transmit request information as in the content requesting device 1, and configure a series of content information elements from a plurality of fragment content information elements by receiving the fragment content information as in the content receiving device 4. The content receiving device 4 may also receive instruction information and fragment and transmit the series of content information elements accumulated by the content information accumulating section 42 according to the instruction information. For example, after the content receiving device 4 receives a plurality of fragment content information elements and configures a series of content information elements from the plurality of fragment content information elements, the content receiving device 4 may operate as the content holding device 3 holding the series of content information elements.

The content receiving device 4 may have the request information transmitting section 12 to transmit request information. That is, the content requesting device 1 and the content receiving device 4 may be configured as an integrated device.

As such, in the information communication system according to this embodiment, the content requesting device 1 makes a request of a series of content information elements to the server 2, so that the content receiving device 4 can receive a plurality of fragment content information configuring the series of content information elements, thereby acquiring a desired series of content information elements. Therefore, the content requesting device 1 does not need to send request information to each of the content holding devices 3 and a process in the content requesting device 1 is simplified.

In particular, when a general user possesses the content requesting device 1, the content holding device 3, and the content receiving device 4, in the content requesting device 1, it is considered to be difficult for the content requesting device 1 to know which series of content information elements is held by each content holding device 3 from the viewpoint of actual information transmission/reception and from the viewpoint of security. On the other hand, it is easy to manage a series of content information elements held by each content holding device 3 in the server 2 managed by a provider. Therefore, it is considered that an operation in which the content request device 1 transmits request information to the server 2, the content holding device 3 to transmit fragment content information to the server 2 is selected, and a plurality of fragment content information are transmitted from the content holding device 3 to the content receiving device 4 is preferred in the case where the general user possesses the content requesting device 1, the content holding device 3, and the content receiving device 4.

In this embodiment, the case where the content holding device 3 has the fragmentation section 33 has been described, but others are also possible. For example, when a series of content information elements is divided in advance into a plurality of files and each file corresponds to fragment content information, the content information transmitting section 34 may read the transmitted fragment content information from the content information storing section 32 according to instruction information received by the instruction information receiving section 31 and transmit the read fragment content information to the content receiving device 4.

In this embodiment, the case where the server 2 has the change request information receiving section 25 and the corresponding information changing section 26 has been described, but the server 2 may not have the change request information receiving section 25 or the correspondence information changing section 26 when the server 2 does not change correspondence information according to change request information, for example, when the correspondence information is manually changed. In this case, the content holding device 3 may also not have the change request information transmitting section 36.

In this embodiment, the case where the content holding device 3 has the content information acquiring section 35 has been described, but, for example, the content holding device 3 may not have the content information acquiring section 35 in the case where the content information storing section 32 is configured by mounting a removable recording medium in which a series of content information elements is accumulated in advance, in the content holding device 3.

(Embodiment 2)

An information communication system according to an embodiment 2 of the present invention will be described with reference to the drawings. In the information communication system according to this embodiment, a content holding device holds fragment content information. A server specifies the content holding device and the fragment content information so that a series of content information elements requested in request information can be configured.

The configuration of the information communication system is the same as that of the information communication system shown in FIG. 1 of the embodiment 1, except that the server 2 becomes a server 5 and the content holding device 3 becomes a content holding device 6, and a description other than that of the server 5 and the content holding device 6 is omitted.

Figure 14:
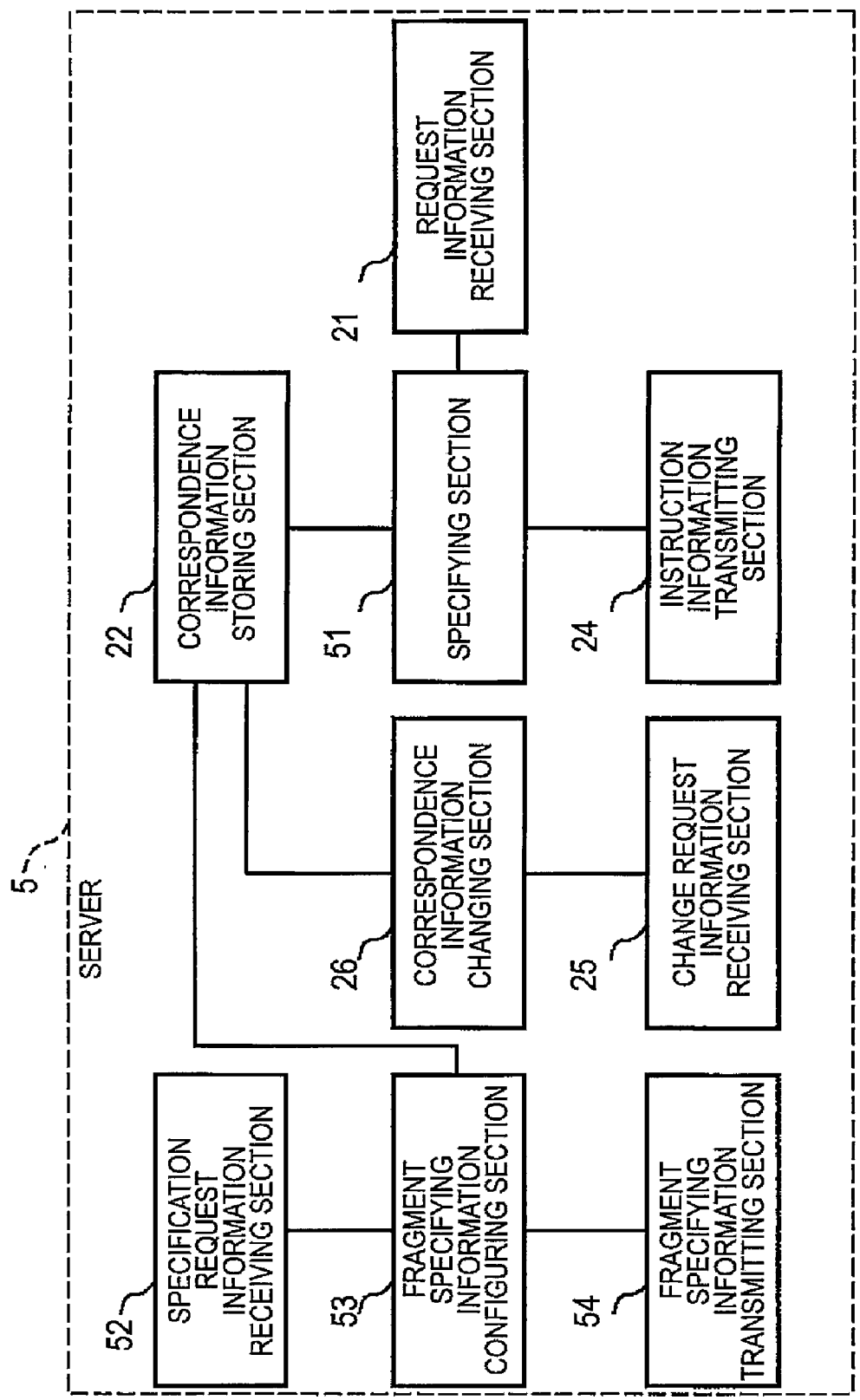
FIG. 14 is a block diagram showing a configuration of a server according to an embodiment 2 of the present invention.

FIG. 14 is a block diagram showing a configuration of the server 5 according to this embodiment. In FIG. 14, the server 5 according to this embodiment includes a request information receiving section 21, a correspondence information storing section 22, an instruction information transmitting section 24, a change request information receiving section 25, a correspondence information changing section 26, a specifying section 51, a specification request information receiving section 52, a fragment specifying information configuring section 53, and a fragment specifying information transmitting section 54. Configurations and operations other than those of the specifying section 51, the specification request information receiving section 52, the fragment specifying information configuring section 53, and the fragment specifying information transmitting section 54 are the same as those of the embodiment 1, except that the content of correspondence information, instruction information, or change request information may be different, and a description thereof is omitted.

It is assumed that at least fragment content information is held in the content holding device 6 according to this embodiment. The correspondence information storing section 22 includes information indicating the correspondence of a plurality of content holding devices 6 with fragment content information held by each of the plurality of content holding devices 6. In this embodiment, for example, the correspondence information may be a series-of-content-information-elements ID and information indicating a position of fragment content information in a series of content information elements identified by the series-of-content-information-elements ID, and information associated with a device ID of a content holding device 6 holding the fragment content information. As in the embodiment 1, the correspondence information may include information in which content holding devices 6 are associated with a series of content information elements held by the content holding devices 6.

Change request information may be information requesting a change of the correspondence information according to acquisition of the series of content information elements in content holding devices 6, or may be information requesting a change of correspondence information according to fragmentation of the series of content information elements or fragment content information in the content holding devices 6. It is assumed that the correspondence information changing section 26 changes the correspondence information according to fragmentation of content information in response to change request information of the latter.

Like the specifying section 23 of the embodiment 1, the specifying section 51 specifies one or more content holding devices 6 and fragment content information held by the one or more content holding devices 6 using the correspondence information. A plurality of fragment content information elements specified by the specifying section 51 can configure a series of content information elements requested in request information received by the request information receiving section 21. Unlike the embodiment 1, since the series of content information elements is not surely held in content holding devices 6, the specifying section 51 specifies content holding devices 6 holding fragment content information capable of configuring the series of content information elements from content holding devices 6 holding the series of content information elements requested in the request information, and specifies the fragment content information held by the specified content holding devices 6.

The specification of the content holding device 6 and the fragment content information held by the content holding device 6 is good when the two are specified as a result. Accordingly, for example, when one fragment content information element is held in a content holding device 6, the content holding device 6 and the fragment content information element can be specified by specifying the content holding device 6. On the other hand, when a certain fragment content information element is held by one content holding device 6, the content holding device 6 and the fragment content information can be specified by specifying the fragment content information.

A method of specifying fragment content information may be the same as that of the embodiment 1 or the specification may be made using an ID when the ID is assigned to fragment content information.

The specifying section 51 may specify fragment content information held by the content holding device 6, or may specify fragment content information into which the fragment content information held by the content holding device 6 has been further fragmented.

The specifying section 51 may or may not perform specification so that a redundant part exists in fragment content information. A method in which the specifying section 51 specifies the content holding device 6 is the same as that of the embodiment 1, and a description thereof is omitted.

The specification request information receiving section 52 receives specification request information. Here, the specification request information is information requesting the specification of fragment content information included in a series of content information elements to be deleted in the content holding device 6. As described later, when the content holding device 6 according to this embodiment has received an instruction regarding the deletion of a series of content information elements, the series of content information elements are fragmented without simply deleting the series of content information elements, and fragment content information as part of the series of content information elements remains without deletion and is continuously held. The specification request information is information requesting that fragment content information to be continuously held be specified among the series of content information elements to be deleted. Information capable of being included in the specification request information is as follows.

(1) ID of a series of content information elements for which an instruction regarding deletion has been received (2) Information capable of specifying a content holding device 6

The above-described information (2) may be a source address included in a header of a packet of the specification request information, that is, an address of the content holding device 6, or a device ID of the content holding device 6.

The specification request information receiving section 52 may or may not include a receiving device for performing reception (for example, a modem, a network card, or the like). The specification request information receiving section 52 may be realized by hardware or may be realized by software such as a driver or like, which operates the receiving device.

When the specification request information receiving section 52 has received specification request information, the fragment specifying information configuring section 53 configures fragment specifying information for the content holding device 6 transmitting the specification request information. Here, the fragment specifying information is information for specifying fragment content information included in a series of content information elements. The fragment specifying information is the same as that included in the instruction information described in the embodiment 1.

Here, a method in which the fragment specifying information configuring section 53 specifies fragment content information included in a series of content information elements will be described. Specifically, there will be described a fragmentation rule indicating how many fragment content information elements a series of content information elements is fragmented into at what position, and an assignment rule indicating which fragment content information element is assigned to the content holding device 6 transmitting specification request information among a plurality of fragment content information elements into which the series of content information elements has been fragmented.

[Fragmentation Rule]

(1) A fragmentation position is defined for every series of content information elements.

A fragmentation rule may be to perform fragmentation according to a fragmentation position set for every series of content information elements. The fragmentation position may be set by manpower. For example, when the series of content information elements is the video of a drama, a fragmentation position may be preset by manpower so that fragmentation is performed at a good dividing position or the fragmentation may be performed according to a set rule. The fragmentation position may be set by the content of the series of content information elements. For example, when the series of content information elements is the video of a broadcast drama of one episode and a plurality of CMs are included therein, setting may be made so that fragmentation is performed at a start position of a CM or an end position of the CM. The fragmentation may be performed by detecting a CM position in the series of content information elements. For example, setting may be made so that the fragmentation is performed at a position where an audio level is equal to or less than a threshold and a video change is almost absent. A fragmentation position may be determined by other methods.

(2) Fragmentation into a predetermined number of items is made equally.

The fragmentation rule may be to equally fragment a series of content information elements into a predetermined number of fragment content information elements. For example, the predetermined number of elements may be preset or may be set at timing when specification request information has been received. In the latter case, for example, the predetermined number of items may be set according to the number of content holding devices 6 holding the series of content information elements in which fragment content information must be specified at a time point of the setting. As described in the embodiment 1, since it becomes inefficient when the number of fragmentations is large, an upper limit may be set for the predetermined number of items. When the predetermined number of items is determined at timing when specification request information has been received, for example, the predetermined number of items may be determined according to the total number of items including: the number of content holding devices 6 predicted to hold a series of content information elements in the near future based on the tendency of the number of content holding devices 6 holding the series of content information elements in which fragment content information must be specified to increase; as well as the number of content holding devices 6 already holding the series of content information elements. Also in this case, an upper limit may be set.

(3) Fragmentation is made for every predetermined capacity.

The fragmentation rule may be to fragment a series of content information elements into fragment content information for every predetermined data capacity. In this way, the capacity of fragment content information may be uniform. For example, a size of data capacity may be predetermined or determined at timing when specification request information has been received. In the latter case, for example, the data capacity of fragment content information may be determined by considering the number of content holding device 6 holding a series of content information elements in which the fragment content information must be specified at a time point of the determination. More specifically, when 512 bytes, 1024 bytes, 2048 bytes, etc. are preset as candidates of the data capacity of fragment content information, a candidate of a larger data capacity than a capacity after equally dividing the capacity of the series of content information elements by the number of content holding devices 6 holding the series of content information elements at the time may be determined as the data capacity of fragment content information. As in the case of "(2) Fragmentation into a predetermined number of items is equally made", the data capacity may also be determined by predicting the number of content holding devices 6.

[Assignment Rule]

The fragment specifying information configuring section 53 may assign a plurality of fragment content information elements into which a series of content information elements has been fragmented in sequence from the start thereof, in sequence from the end thereof, or at random, or by other methods. For example, in the case of assignment in sequence from the beginning, the fragment specifying information configuring section 53 may assign an Nth fragment content information element from the start to an Nth content holding device 6, which performs the assignment of fragment content information. In this regard, N is an integer equal to or greater than 1.

As such, when the specification request information receiving section 52 has received specification request information, the fragment specifying information configuring section 53 assigns one of fragment content information elements into which a series of content information elements has been fragmented according to a predetermined fragmentation rule to a content holding device 6 transmitting the specification request information according to a predetermined assignment rule, and configures fragment specifying information to specify the fragment content information. Information capable of being included in the fragment specifying information is as follows.

(1) Series-of-content-information-elements ID (2) Information capable of specifying a position of fragment content information The above-described information (1) is the same as a series-of-content-information-elements ID included in specification request information, and may not be included in the fragment specifying information. As long as the content holding device 6 does not transmit two or more specification request information elements at one time, it is possible to determine which series of content information elements the fragment specifying information is associated with in the content holding device 6 even when the series-of-content-information-elements ID is not included in the fragment specifying information.

For example, information capable of specifying a position of fragment content information in a series of content information elements may be information indicating start and end positions of the fragment content information in the series of content information elements as described in the embodiment 1, may be information indicating the sequence of fragment content information when a rule is preset to fragment the series of content information elements, or may be other information.

The fragment specifying information configuring section 53 may or may not further configure fragment specifying information as information for specifying fragment content information included in related content information held by a related holding device, which is a content holding device 6 holding the related content information among content holding devices 6 other than a content holding device 6 transmitting specification request information. Here, the related content information is content information including at least part of a series of content information elements for which the specification of fragment content information is requested in the specification request information (or may be the series of content information elements or the fragment content information). That is, the fragment specifying information configuring section 53 may configure fragment specifying information for a content holding device 6 holding at least part of a series of content information elements for which the specification of fragment content information has been requested in the specification request information (a content holding device 6 transmitting the specification request information and a content holding device 6 as a related holding device). The related content information may be limited to fragment content information. This is because it is not preferable to force the fragmentation of a series of content information elements held by content holding devices 6 and non-fragmented by an instruction from the server 5. In this case, as described above, the fragment specifying information configuring section 53 may determine a position where a series of content information elements is fragmented and the assignment of fragment content information to each content holding device 6 (including a related holding device). Accordingly, for example, the fragment specifying information configuring section 53 may configure fragment specifying information so that fragmentation into a number of fragments is made according to the number of content holding devices 6 holding at least part of a series of content information elements for which the specification of fragment content information has been requested in specification request information received by the specification request information receiving section 52, that is, the number of items including a content holding device 6 transmitting the specification request information and a related content holding device holding related content information. An upper limit may be set in this case as well.

This case may include the case where fragment content information is further fragmented into fragment content information in a content holding device 6 as a related holding device. Accordingly, since the assignment of fragment content information may not be arbitrarily determined, the fragment specifying information configuring section 53 may perform the assignment of assignable fragment content information, for example, in sequence from a content holding device 6 in which the capacity of related content information is small.

The fragment specifying information transmitting section 54 transmits fragment specifying information configured by the fragment specifying information configuring section 53 to a content holding device 6. The content holding device 6 of a destination of the fragment specifying information is that which transmits the specification request information. For example, the fragment specifying information transmitting section 54 may transmit the fragment specifying information by setting a source address of the specification request information received by the specification request information receiving section 52 to a destination address of the fragment specifying information.

The fragment specifying information transmitting section 54 may also transmit fragment specifying information, configured by the fragment specifying information configuring section 53 for related content information held by a related holding device, to the related holding device.

The fragment specifying information transmitting section 54 may directly transmit fragment specifying information to a content holding device 6, or may transmit the fragment specifying information through another server or the like.

The fragment specifying information transmitting section 54 may or may not include a transmitting device for performing transmission (for example, a modem, a network card, or the like). The fragment specifying information transmitting section 54 may be realized by hardware or may be realized by software such as a driver or like, which operates the transmitting device.

By the transmission of fragment specifying information as described later, a series of content information elements or fragment content information is fragmented in the content holding device 6. Accordingly, the correspondence information changing section 26 may update correspondence information according to the configuration or transmission of fragment specifying information, or may change the correspondence information by waiting for change request information according to the fragmentation to be received.

Figure 15:
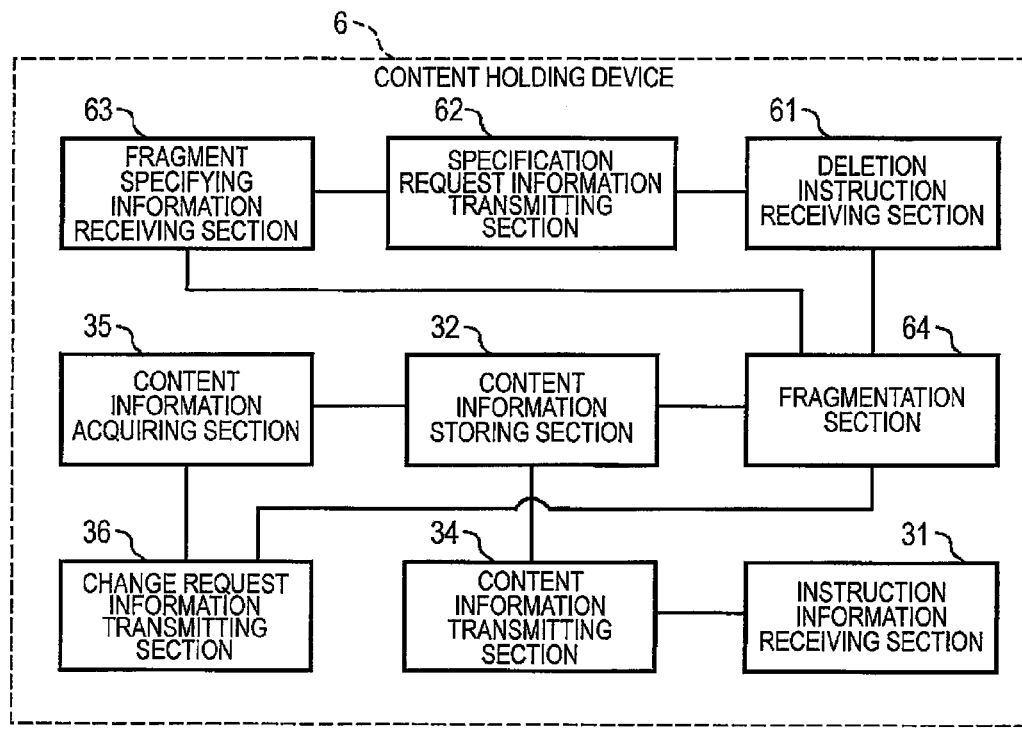
FIG. 15 is a block diagram showing a configuration of a content holding device according to the same embodiment.

FIG. 15 is a block diagram showing a configuration of the content holding device 6 according to this embodiment. In FIG. 15, the content holding device 6 according to this embodiment includes an instruction information receiving section 31, a content information storing section 32, a content information transmitting section 34, a content information acquiring section 35, a change request information transmitting section 36, a deletion instruction receiving section 61, a specification request information transmitting section 62, a fragment specifying information receiving section 63, and a fragmentation section 64. The configuration and operation other than those of the deletion instruction receiving section 61, the specification request information transmitting section 62, the fragment specifying information receiving section 63, and the fragmentation section 64 are the same as those of the embodiment 1, except that at least fragment content information is stored in the content information storing section 32 and the change request information transmitting section 36 transmits change request information requesting a change of correspondence information according to acquisition of a series of content information elements and also transmits change request information requesting a change of correspondence information according to fragmentation of a series of content information elements or fragment content information, and a description thereof is omitted.

The deletion instruction receiving section 61 receives an instruction regarding the deletion of a series of content information elements stored in the content information storing section 32. The instruction regarding the deletion is, in general, an instruction for the deletion of all the series of content information elements, but may be an instruction for the deletion of part of the series of content information elements. Here, for example, the reception may be that of information input from an input device (for example, a keyboard, a mouse, or a touch panel), may be that of information transmitted through a wired or wireless communication link, may be that of information read from a predetermined recording medium (for example, an optical disk, a magnetic disk, a semiconductor memory, or the like), or may be that of information from a predetermined component. The deletion instruction receiving section 61 may or may not include a device for performing reception (for example, a modem, a network card, or the like). The deletion instruction receiving section 61 may be realized by hardware or may be realized by software such as a driver or like, which operates a predetermined device.

When the deletion instruction receiving section 61 has received a deletion instruction, the specification request information transmitting section 62 transmits specification request information as information requesting the specification of fragment content information included in a series of content information elements to be deleted to the server 5. As described above, the specification request information may include an ID of the series of content information elements for which an instruction regarding the deletion has been received or information capable of specifying a content holding device 6 to transmit the specification request information.

The specification request information transmitting section 62 may hold an address of the server 5 as a destination of the specification request information in a recording medium (not shown), or may acquire it from another component or another device upon transmission of the specification request information. The specification request information transmitting section 62 may directly transmit the specification request information to the server 5 or may transmit it through another server or the like.

The specification request information transmitting section 62 may or may not include a transmitting device for performing transmission (for example, a modem, a network card, or the like). The specification request information transmitting section 62 may be realized by hardware or may be realized by software such as a driver or like, which operates the transmitting device.

The fragment specifying information receiving section 63 receives fragment specifying information transmitted from the server 5. As described above, the fragment specifying information is information for specifying fragment content information included in a series of content information elements. The fragment specification information may or may not be a response to the transmission of specification request information by the specification request information transmitting section 62. In the latter case, the fragment specifying information may be used to specify fragment content information included in related content information (or may be a series of content information elements or fragment content information). As described above, the related content information is content information including at least part of a series of content information elements for which the specification of fragment content information has been requested in specification request information transmitted by another content holding device 6.

The fragment specifying information receiving section 63 may or may not include a receiving device for performing reception (for example, a modem, a network card, or the like). The fragment specifying information receiving section 63 may be realized by hardware or may be realized by software such as a driver or like, which operates the receiving device.

The fragmentation section 64 generates fragment content information by fragmenting a series of content information elements for which the deletion instruction receiving section 61 has received a deletion instruction. The fragment content information is stored in the content information storing section 32. The fragmentation section 64 deletes the series of content information elements for which the deletion instruction has been received from the content information storing section 32.

The fragmentation section 64 generates fragment content information by fragmenting a series of content information elements to be deleted according to fragment specifying information received by the fragment specifying information receiving section 63. Specifically, the fragmentation section 64 generates fragment content information specified by the fragment specifying information from the series of content information elements to be deleted and stores the fragment content information in the content information storing section 32. The fragmentation section 64 deletes the series of content information elements so that the series of content information elements to be deleted are not stored in the content information storing section 32.

The fragmentation section 64 may fragment a series of content information elements or fragment content information according to fragment specifying information for specifying fragment content information included in related content information. In this case, the fragmentation section 64 may generate fragment content information into which the fragment content information has been further fragmented and delete the original fragment content information.

As described above, the change request information transmitting section 36 also transmits change request information as information requesting a change of correspondence information to the server 5 according to fragmentation of a series of content information elements or fragment content information by the fragmentation section 64.

Figure 16:
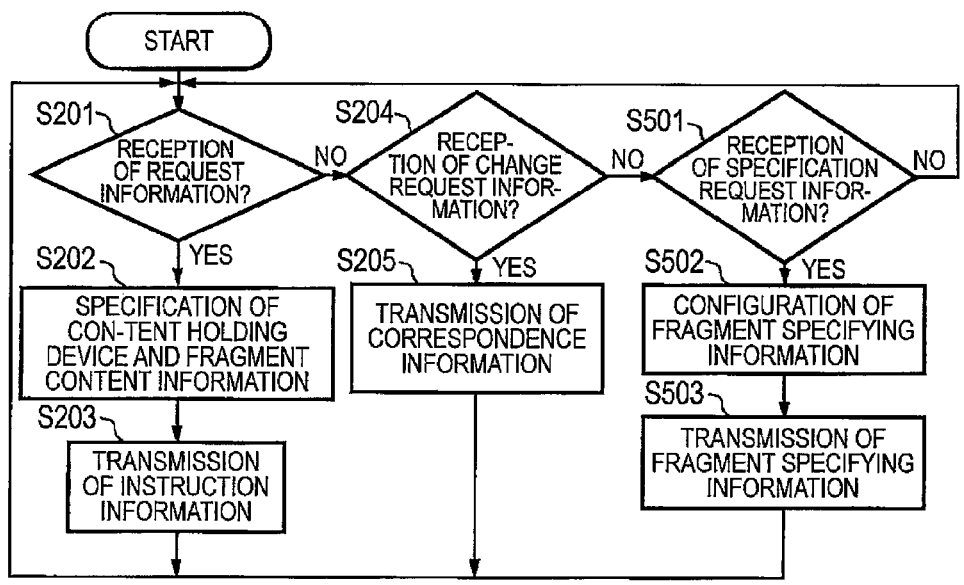
FIG. 16 is a flowchart showing an operation of the server according to the same embodiment.

Next, the operation of the server 5 according to this embodiment will be described using the flowchart of FIG. 16. A process other than steps S501 to S503 is the same as that of the flowchart of FIG. 7 of the embodiment 1, except that a method of specifying a content holding device 6 or the like in the specifying section 51 as described above is different from that of the embodiment 1, the change request information receiving section 25 also receives change request information according to fragmentation, and the correspondence information changing section 26 also changes correspondence information according to the change request information, and a description thereof is omitted.

(Step S501) The specification request information receiving section 52 determines whether specification request information has been received. When the specification request information has been received, it proceeds to step S502. Otherwise, it returns to step S201.

(Step S502) The fragment specifying information configuring section 53 configures fragment specifying information, which specifies fragment content information for which specification has been requested in specification request information as described above. The fragment specifying information configuring section 53 may configure fragment specifying information for specifying fragment content information included in related content information as described above.

(Step S503) The fragment specifying information transmitting section 54 transmits the fragment specifying information configured by the fragment specifying information configuring section 53 to a content holding device 6 corresponding to the fragment specifying information. When fragment specifying information for a related holding device has been configured, the fragment specifying information transmitting section 54 transmits the fragment specifying information corresponding to the related holding device, to the related holding device. Then, it returns to step S201.

Figure 17:
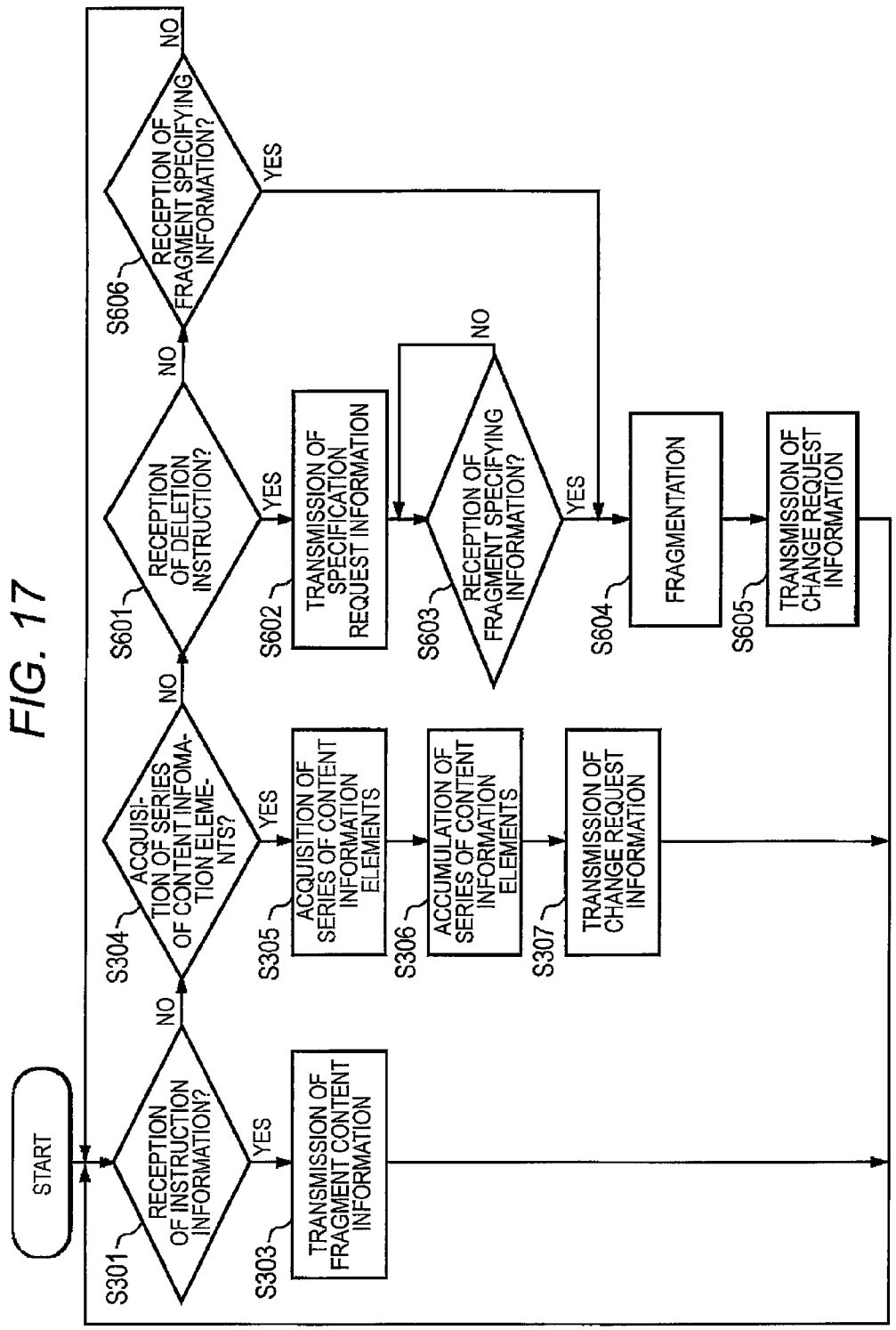
FIG. 17 is a flowchart showing an operation of the content holding device according to the same embodiment.

Next, the operation of the content holding device 6 according to this embodiment will be described using the flowchart of FIG. 17. A process other than steps S601 to S606 is the same as that of the flowchart of FIG. 8 of the embodiment 1, except that fragment content information is transmitted without fragmenting a series of content information elements after receiving instruction information, and a description thereof is omitted.

(Step S601) The deletion instruction receiving section 61 determines whether a deletion instruction has been received. When the deletion instruction has been received, it proceeds to step S602. Otherwise, it proceeds to step S606.

(Step S602) The specification request information transmitting section 62 transmits specification request information requesting the specification of fragment content information included in a series of content information elements for which the deletion has been instructed by the deletion instruction to the server 5.

(Step S603) The fragment specifying information receiving section 63 determines whether fragment specifying information has been received. When the reception has been made, it proceeds to step S604. Otherwise, a process of step S603 is repeated until fragment specifying information is received. In the case where fragment specifying information has not been received even when a predetermined time has elapsed after the transmission of the specification request information of step S602, the fragment specifying information receiving section 63 determines that the reception has timed out, and ends a process of determining whether the fragment specifying information has been received. Then, it may return to S301. In this case, the user may or may not be notified of the fact that an error has occurred.

(Step S604) The fragmentation section 64 fragments a series of content information elements or fragment content information according to fragment specifying information received by the fragment specifying information receiving section 63 in step S603 or step S606 described later, and generates fragment content information. The series of content information elements or the fragment content information before the fragmentation are deleted.

(Step S605) The change request information transmitting section 36 transmits change request information requesting a change of correspondence information to the server 5 according to the fragmentation of step S604. Then, it returns to step S301.

(Step S606) The fragment specifying information receiving section 63 determines whether fragment specifying information has been received. When the reception has been made, it proceeds to step S604. The reception of fragment specifying information in step S606 is not made according to the transmission of specification request information, and is therefore fragment specifying information corresponding to related content information.

Next, the operation of the information communication system according to this embodiment will be described using a specific example. In the specific example, a process different from that of the embodiment 1 will be mainly described, and a detailed description of the same process as that of the embodiment 1 is omitted.

Also in the specific example, it is assumed that the content requesting device 1 is a portable phone, the content holding device 6 and the content receiving device 4 are hard disk recording and playback equipment connected to a display.

It is assumed that correspondence information shown in FIG. 18 is stored in the correspondence information storing section of the server 5. In the correspondence information of FIG. 18, a content information ID as information of identifying content information is associated with a content holding device ID. The content information ID is information including a series-of-content-information-elements ID for identifying a series of content information elements included in content information identified by the content information ID and position information indicating a position in the series of content information elements of the content information identified by the content information ID. The position information is information indicating the start and end positions of the content information. When the term "series" is included in the position information, it indicates that the content information is a series of content information elements. A first record of FIG. 18 indicates that a series of content information elements "FC001" is held in a content holding device "A001". It can be seen that the series of content information elements "FC001" is 20000 bytes.

It is assumed that a user of the content holding device "A001" has desired to delete a series of content information elements "FC001" and has input an instruction to delete the series of content information elements to the content holding device "A001". Then, the deletion instruction is received by the deletion instruction receiving section 61 (step S601). Then, the specification request information transmitting section 62 configures specification request information including a series-of-content-information-elements ID "FC001" of identifying the series of content information elements as a deletion target and a content holding device ID "A001", and transmits the specification request information to the server 5 (step S602).

The specification request information receiving section 52 of the server 5 receives the specification request information and passes the series-of-content-information-elements ID "FC001" and the content holding device ID "A001" included in the specification request information to the fragment specifying information configuring section 53 (step S501). The fragment specifying information configuring section 53 refers to correspondence information shown in FIG. 18. Since a total of a series of content information elements "FC001" is held by 4 content holding devices 6, the fragment specifying information configuring section 53 determines to divide the series of content information elements "FC001" into 4 equal parts. The fragment specifying information configuring section 53 determines to assign a first fragment content information element of the fragment content information divided into the 4 equal parts to the content holding device "A001", assign a second fragment content information element to a content holding device "A002", assign a third fragment content information element to a content holding device "A003", and assigns a fourth fragment content information element to a content holding device "A004". The fragment specifying information configuring section 53 configures fragment specifying information corresponding to each content holding device 6 (step S502). For example, the fragment specifying information corresponding to the content holding device "A002" includes the series-of-content-information-elements ID "FC001" and "5001st to 10000th (bytes)" as information indicating a position of the fragment content information in the series of content information elements. The fragment specifying information configuring section 53 associates the configured fragment specifying information with the content holding device ID corresponding to the fragment specifying information, and passes them to the fragment specifying information transmitting section 54.

The fragment specifying information transmitting section 54 transmits each fragment specifying information element to a content holding device 6 corresponding to the fragment specifying information (step S503). Here, the 4 fragment specifying information elements are transmitted. For example, the fragment specifying information transmitting section 54 may refer to the information shown in FIG. 12, read an IP address corresponding to each content holding device ID, and transmit a packet of fragment specifying information using the read IP address as a destination address.

The fragment specifying information receiving section 63 of the content holding device "A001" receives fragment specifying information transmitted from the server 5 (step S603), and passes a series-of-content-information-elements ID "FC001" and information of "1st to 5000th (bytes)" indicating a position of fragment content information included in the fragment specifying information to the fragmentation section 64.

The fragmentation section 64 fragments the series of content information elements "FC001" stored in the content information storing section 32, creates fragment content information having 1st to 5000th bytes of the series of content information elements, and deletes the series of content information elements "FC001" (step S604).

Here, the case where a series of content information elements is deleted after creating fragment content information has been described, but the fragmentation section 64 may delete partial information of the series of content information elements other than the fragment content information so that the fragment content information specified by the fragment specifying information remains. When a series of content information elements is configured from a plurality of files and any one of the plurality of files corresponds to fragment content information specified by fragment specifying information, the fragmentation section 64 may delete files other than a file corresponding to the fragment content information. As such, as a result, when fragment content information specified by fragment specifying information is stored in the content information storing section 32, a fragmentation method is no object.

Then, the change request information transmitting section 36 transmits change request information including a series-of-content-information-elements ID "FC001", information of "1st to 5000th (bytes)" indicating a position of fragment content information, and a content holding device ID "A001" to the server 5 (step S605). The change request information is received by the change request information receiving section 25 of the server 5 (step S204), and changes correspondence information according to the change request information (step S205).

On the other hand, the fragment specifying information receiving section 63 of the content holding device "A002" receives fragment specifying information transmitted from the server 5 (step S606), and a series-of-content-information-elements ID "FC001" included in the fragment specifying information and information of "5001st to 10000th (bytes)" indicating a position of fragment content information are transmitted to the fragmentation section 64. The fragmentation section 64 fragments the series of content information elements "FC001" stored in the content information storing section 32, creates fragment content information having 5001st to 10000th bytes of the series of content information elements, and deletes the series of content information elements "FC001" (step S604). Then, as in the case of the content holding device "A001", change request information is transmitted and correspondence information of the server 5 is changed. The same process is performed in the content holding devices "A003" and "A004".

FIG. 19 is a diagram showing correspondence information after a change. As shown in FIG. 19, it can be seen that the series of content information elements "FC001" is fragmented into 4 fragment content information elements, and the content holding devices "A001", "A002", "A003", and "A004" are assigned the fragment content elements. Although not shown in FIG. 19, an end flag indicating that the fragment content information is an end of the series of content information elements may be set to position information of "15001st to 20000th" bytes corresponding to the content holding device ID "A004".

Next, as in the specific example of the embodiment 1, it is assumed that a packet of request information including the series-of-content-information-elements ID "FC001" and the ID "A101" of the content receiving device 4 has been transmitted from the content requesting device 1 to the server 5 (step S102).

The request information packet is received by the request information receiving section 21 of the server 5 (step S201). Then, the specifying section 51 specifies the 4 content holding devices "A001", "A002", "A003", and "A004" holding the fragment content information of the series of content information elements "FC001", and the fragment content information of the series of content information elements "FC001" respectively held thereby. The specifying section 51 configures fragment specifying information corresponding to each content holding device 6 specified. For example, the fragment specifying information corresponding to the content holding device "A001" is as follows.

[Fragment specifying information of the content holding device "A001"]

Series-of-content-information-elements ID: FC001
Start position of fragment content information: 1st byte
End position of fragment content information: 5000th byte As seen from FIG. 19, since 1st to 5000th bytes are only held for the series of content information elements "FC001" in the content holding device "A001", fragment content information thereof may be specified only by the series-of-content-information-elements ID.

As in the case of the specific example of the embodiment 1, the instruction information transmitting section 24 configures a packet of instruction information including an IP address of the content receiving device 4 and fragment specifying information, and transmits the packet to a content holding device 6 corresponding to each instruction information element (step S203).

Except that the content holding device 6 does not fragment a series of content information elements before the transmission of fragment content information, a process (steps S301 and S302) in which the content holding device 6 receiving the instruction information transmits the fragment content information to the content receiving device and a process (steps S401 to S406) in which the content receiving device 4 receives the fragment content information to configure a series of content information elements are the same as those of the specific example of the embodiment 1, and a description thereof is omitted.

Next, the case where re-fragmentation, that is, fragmentation of fragment content information, is performed will be described. For example, it is assumed that a content holding device "A005" has newly acquired the series of content information elements "FC001". Then, the correspondence information of the server 5 is changed according to the acquisition (steps S304 to S307, S204, and S205). As a result, the correspondence information is shown in FIG. 20. Then, it is assumed that the content holding device "A005" has received an instruction to delete the series of content information elements "FC001" (step S601) and specification request information has been transmitted to the server 5 (step S602).

The specification request information is received by the specification request information receiving section 52 (step S501), and the fragment specifying information configuring section 53 refers to the correspondence information of FIG. 20 to configure fragment specifying information (step S502). Specifically, since the series of content information elements "FC001" is 20000 bytes and is held by 5 content holding devices 6, the fragment specifying information configuring section 53 determines to divide the series of content information elements into 5 equal parts each having 4000 bytes. Since the content holding devices "A001", "A002", "A003", and "A004" do not hold a total of the series of content information elements "FC001", the assignment of fragment content information is determined from a content holding device 6, which does not hold the series of content information elements. That is, the content holding device "A001" is assigned 1st to 4000th bytes, the content holding device "A002" is assigned 5001st to 9000th bytes, the content holding device "A003" is assigned 10001st to 14000th bytes, and the content holding device "A004" is assigned 15001st to 19000th bytes. The content holding device "A005" is assigned the remaining 4001st to 5000th bytes, 9001st to 10000th bytes, 14001st to 15000th bytes, and 19001st to 20000th bytes. The fragment specifying information configuring section 53 configures fragment specifying information corresponding thereto, and the fragment specifying information transmitting section 54 transmits the fragment specifying information to the content holding device 6 corresponding to the fragment specifying information (step S503).

Next, the series of content information elements or the fragment content information is fragmented in the content holding device 6 (step S604) and change request information is transmitted to the server (step S605). A process in which correspondence information is changed in the server 5 is the same as described above, and a description thereof is omitted (steps S204 and S205). The changed correspondence information is shown in FIG. 21. As shown in FIG. 21, the fragment content information may be continuous information in the series of content information elements or may be a set of discrete information elements in the series of content information elements. A subsequent process is the same as in the description of the specific example, and a description thereof is omitted.

In this specific example, a case has been described where fragment specifying information is transmitted to a content holding device 6 transmitting specification request information and a content holding device 6 as a related holding device when the specification request information is transmitted from a certain content holding device 6, but the server 5 may transmit the fragment specifying information to the content holding device 6 transmitting the specification request information. For example, in this case where the correspondence information becomes as shown in FIG. 18, correspondence information after fragment specifying information is transmitted from each of the content holding devices "A001", "A002", "A003", and "A004" becomes as shown in FIG. 19. In the case, when the server 5 has received request information before the series of content information elements "FC001" is fragmented in all the 4 content holding devices 6, the server 5 may instruct the content holding devices 6 holding the series of content information elements "FC001" to transmit the series of content information elements to the content receiving device 4, or may transmit instruction information to instruct a content holding device 6, in which fragmentation is performed, to transmit held fragment content information to the content receiving device 4 and may transmit instruction information to instruct a content holding device 6, in which fragmentation is not yet performed, to fragment and transmit the held series of content information elements "FC001" to the content receiving device 4.

As such, according to the information communication system according to this embodiment, the content requesting device 1 makes a request for the series of content information elements to the server 5, so that the content receiving device 4 can receive a plurality of fragment content information elements configuring the series of content information elements, thereby acquiring a desired series of content information elements. Accordingly, the content requesting device 1 does not need to transmit request information to each of the content holding devices 6, thereby simplifying a process in the content requesting device 1.

Even when the content holding devices 6 have received a deletion instruction for a series of content information elements, fragment content information in which the series of content information elements has been fragmented is continuously held, thereby securing the number of content holding devices 6 holding the fragment content information. In the case where the content holding device 6 also has a function of the content requesting device 1 or the content receiving device 4, the content holding device 6 can again acquire a deleted series of content information elements by transmitting request information to the server 5 when desiring to acquire the series of content information elements even though the series of content information elements has been deleted. In this case, the content holding device 6 can further reduce the capacity of held content information than when the series of content information elements itself is held.

In this embodiment, the case where the server 5 configures fragment specifying information according to transmission of specification request information from the content holding device 6 has been described, but others are also possible. That is, the server 5 may configure and transmit fragment specifying information regardless of the reception of specification request information. In the case, the fragment specifying information configuring section 53 respectively configures fragment specifying information as information for specifying fragment content information included in a series of content information elements for every plurality of content holding devices 6 holding the series of content information elements as a fragmentation target. Fragment specifying information configured by the fragment specifying information configuring section 53 is transmitted to a content holding device 6 corresponding to the fragment specifying information. The configuration of fragment specifying information is the same as described in this embodiment. When the server 5 does not receive specification request information, the server 5 may be configured without the specification request information receiving section 52 as shown in FIG. 22, and the content holding device 6 may be configured without the deletion instruction receiving section 61 and the specification request information transmitting section 62 as shown in FIG. 23.

Figure 22:
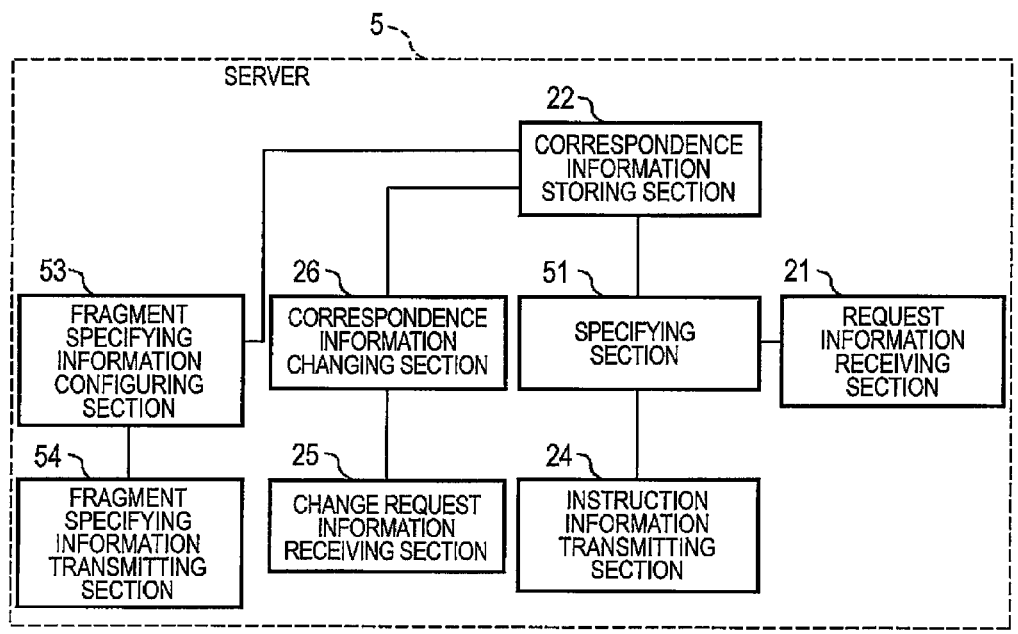
FIG. 22 is a block diagram showing another example of the configuration of the server according to the same embodiment.
Figure 24:
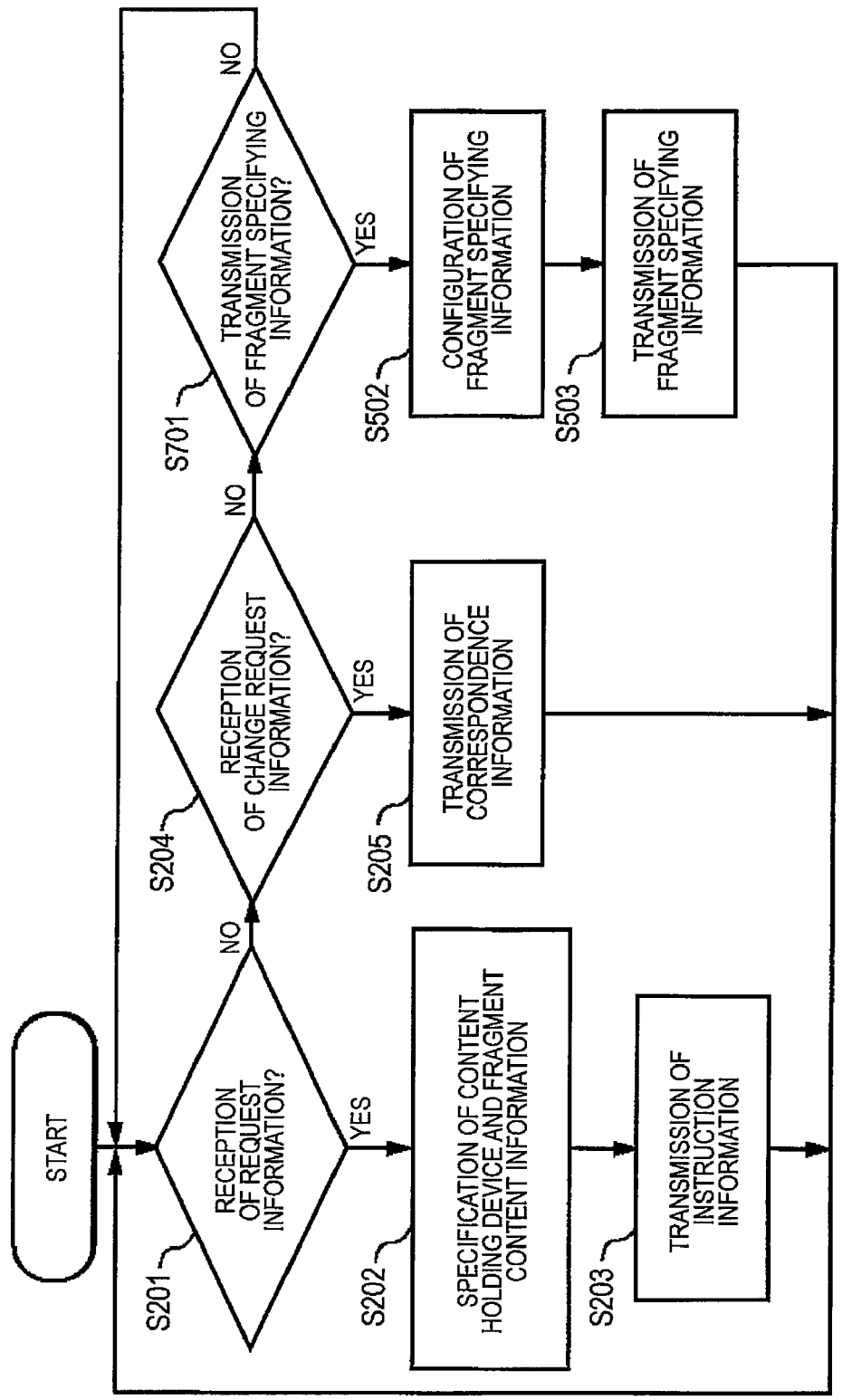
FIG. 24 is a flowchart showing another example of the operation of the server according to the same embodiment.

When the server 5 has the configuration shown in FIG. 22, the operation of the server 5 becomes the flowchart shown in FIG. 24. Except for the process of step S701, the flowchart of FIG. 24 is the same as that of FIG. 16. In step S701, the fragment specifying information configuring section 53 determines whether it is the timing to transmit fragment specifying information. When it is the timing to transmit, it proceeds to step S502. Otherwise, it returns to step S201. The timing determined to transmit fragment specifying information is no object. For example, for a certain series of content information elements, the timing may be a point of time when the number of content holding devices 6 holding a series of content information elements is greater than a predetermined threshold. When the content holding devices 6 acquire a broadcast series of content information elements, the timing may be a point of time at which the broadcast of the series of content information elements ends and a change of correspondence information to the acquisition of the series of content information elements ends (for example, after 10 minutes from the broadcast end of the series of content information elements). The timing may be a point of time when request information has been first received for a certain series of content information elements, or may be other points of time. When it is determined that fragment specifying information is transmitted at a point of time when the request information has been first received, fragment specifying information and instruction information may be simultaneously transmitted and the fragment specifying information may be transmitted before the instruction information is transmitted.

Figure 23:
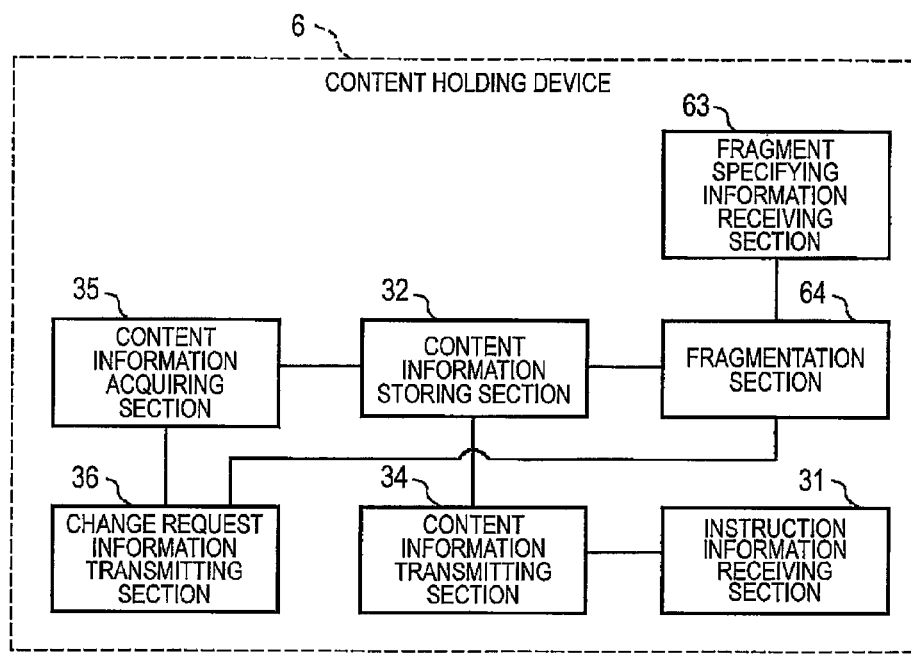
FIG. 23 is a block diagram showing another example of the configuration of the content holding device according to the same embodiment.
Figure 25:
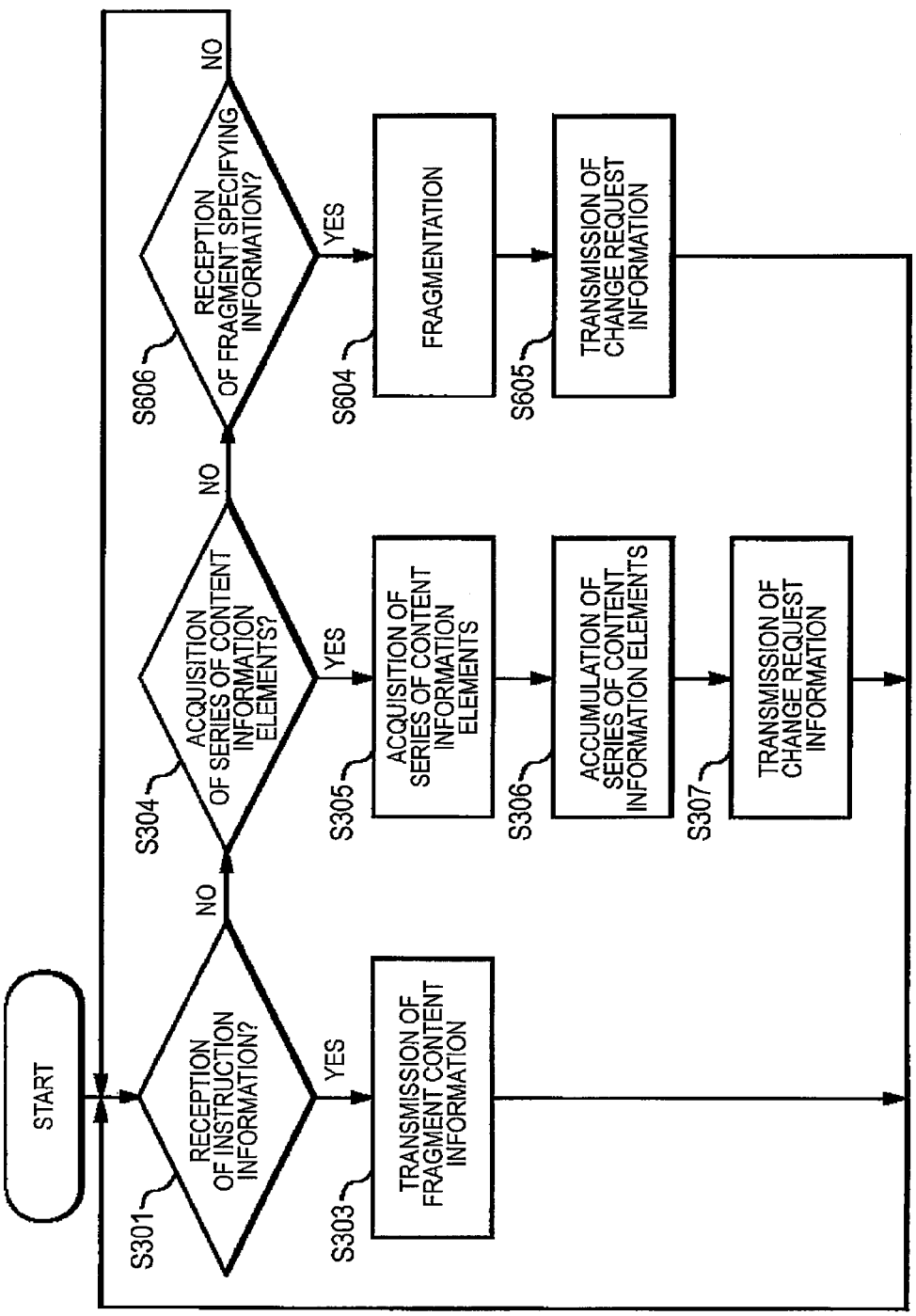
FIG. 25 is a flowchart showing another example of the operation of the content holding device according to the same embodiment.

When the content holding device 6 has the configuration shown in FIG. 23, the operation of the content holding device 6 becomes the flowchart shown in FIG. 25. The flowchart of FIG. 25 is the same as that of FIG. 17, except that the process of steps S601 to S603 is not performed.

In this embodiment, the case where the correspondence information changing section 26 changes correspondence information according to change request information received by the change request information receiving section 25 in the server 5 has been described, but the correspondence information changing section 26 may change correspondence information according to transmission of fragment specifying information by the fragment specifying information transmitting section 54. In this case, even when the fragment specifying information receiving section 63 of the content holding device 6 has received fragment specifying information and the fragmentation section 64 has fragmented content information, the change request information transmitting section 36 may not transmit change request information according to the fragmentation.

In this embodiment, the case where the content holding device 6 reads and transmits fragment content information stored in the content information storing section 32 has been described, but the content holding device 6 may transmit fragment content information into which content information (which may be a series of content information elements or fragment content information) stored in the content information storing section 32 has been fragmented. In this case, the specifying section 51 can specify any other fragment content information besides information held in the content holding device 6.

In this embodiment, the case where specification request information is transmitted from a content holding device 6 and fragment specifying information is configured according to reception of the specification request information by the server 5 and transmitted to the content holding device 6 has been described, but others are also possible. For example, as described in the embodiment 1, when a fragmentation rule of a series of content information elements is preset and fragment content information assigned to each content holding device 6 is regularly set, the fragment content information may be generated from a series of content information elements in the content holding device 6 without transmitting/receiving specification request information or fragment specifying information. In this case, the server 5 may not have the specification request information receiving section 52, the fragment specifying information configuring section 53, and the fragment specifying information transmitting section 54, and the content holding device 6 may not have the specification request information transmitting section 62 and the fragment specifying information receiving section 63. The fragmentation of the series of content information elements may not be made according to a deletion instruction. In this case, the content holding device 6 may not have the deletion instruction receiving section 61.

In this embodiment, the case where the server 5 has the change request information receiving section 25 and the correspondence information changing section 26 has been described, but the server 5 may not have the change request information receiving section 25 or the correspondence information changing section 26, when the change of correspondence information in the server 5 is not performed according to change request information, for example, when correspondence information is manually changed. In the case, the content holding device 6 may also not have the change request information transmitting section 36.

In this embodiment, the case where the content holding device 6 acquires and fragments a series of content information elements and the fragmented series of content information elements is stored in the content information storing section 32 has been described, but the content holding device 6 may not have the content information acquiring section 35 when the series of content information elements are pre-stored in the content information storing section 32. In this case, the change request information transmitting section 36 may transmit only change request information requesting a change according to fragmentation by the fragmentation section 64. In this case, when fragment content information fragmented in advance is stored in the content information storing section 32, the content information transmitting section 34 may read and transmit fragment content information according to instruction information received by the instruction information receiving section 31, and the content holding device 6 may not have the change request information transmitting section 36 or the fragmentation section 64.

(Embodiment 3)

An information communication system according to an embodiment 3 of the present invention will be described with reference to the drawings. The information communication system according to this embodiment specifies fragment content information in a plurality of fragment content information transmitted from content holding devices so that redundancy occurs.

The information communication system according to this embodiment is the same as those of the embodiments 1 and 2, except that a method of specifying fragment content information in a server is different from those of the embodiments 1 and 2, and a description other than that of the method of specifying fragment content information is omitted.

In this embodiment, there will be described the case where the specifying section 23 according to the embodiment 1 specifies fragment content information so that redundancy occurs. The configuration of the information communication system according to this embodiment and the configuration of each device configuring the information communication system are the same as those of the embodiment 1, and a description thereof is omitted.

The specifying section 23 specifies one or more content holding devices 3 holding content information including at least part of a series of content information elements requested in request information received by the request information receiving section 21, and a plurality of fragment content information elements included at least in the content information held by the one or more content holding devices 3 using correspondence information so that the series of content information elements requested in the request information is able to be configured by the plurality of fragment content information elements and at least one fragment content information element of the plurality of fragment content information elements is redundant fragment content information capable of being configured by other fragment content information.

Figure 26:
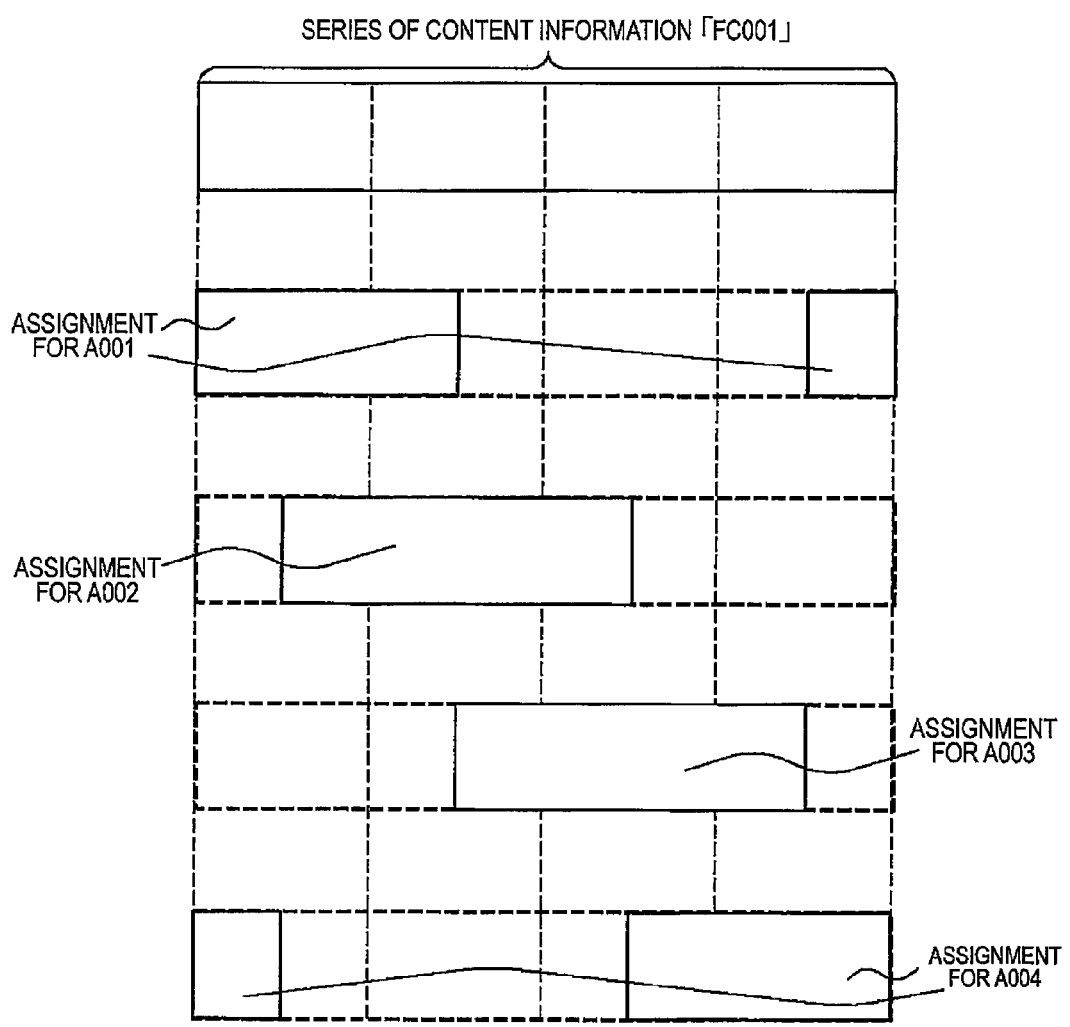
FIG. 26 is a diagram showing an example of fragmentation of a series of content information elements according to an embodiment 3 of the present invention.

Specifically, when fragment content information in which a series of content information elements "FC001" has been fragmented is assigned to 4 content holding devices "A001", "A002", "A003", and "A004", it may be assigned to each content holding device 3 as shown in FIG. 26. In this way, for example, even when a certain error occurs and fragment content information transmitted from the content holding device "A002" is not received by the content receiving device 4, the content receiving device 4 can configure the series of content information elements "FC001" by using fragment content information transmitted from a content holding device 3 other than the content holding device "A002".

As shown in FIG. 26, a method of specifying content holding devices 3 and fragment content information will be described. For example, the specifying section 23 specifies content holding devices 3 holding a requested series of content information elements and specifies the uniform capacity of fragment content information in the specified content holding devices 3 as in the embodiment 1. In this case, as shown in FIG. 11, the fragment content information is specified. Additionally, the specifying section 23 respectively adds information of half the capacity of the fragment content information at the time, that is, additional fragment content information, to the start and end sides of the fragment content information assigned to each content holding device 3, and makes new fragment content information by including the additional fragment content information and the original fragment content information. In this case, the start and end edges of the series of content information elements are connected as a ring and considered as the same position, so that such a process is performed. In this way, each fragment content information element can become redundant fragment content information capable of being configured by other fragment content information.

Figure 27:
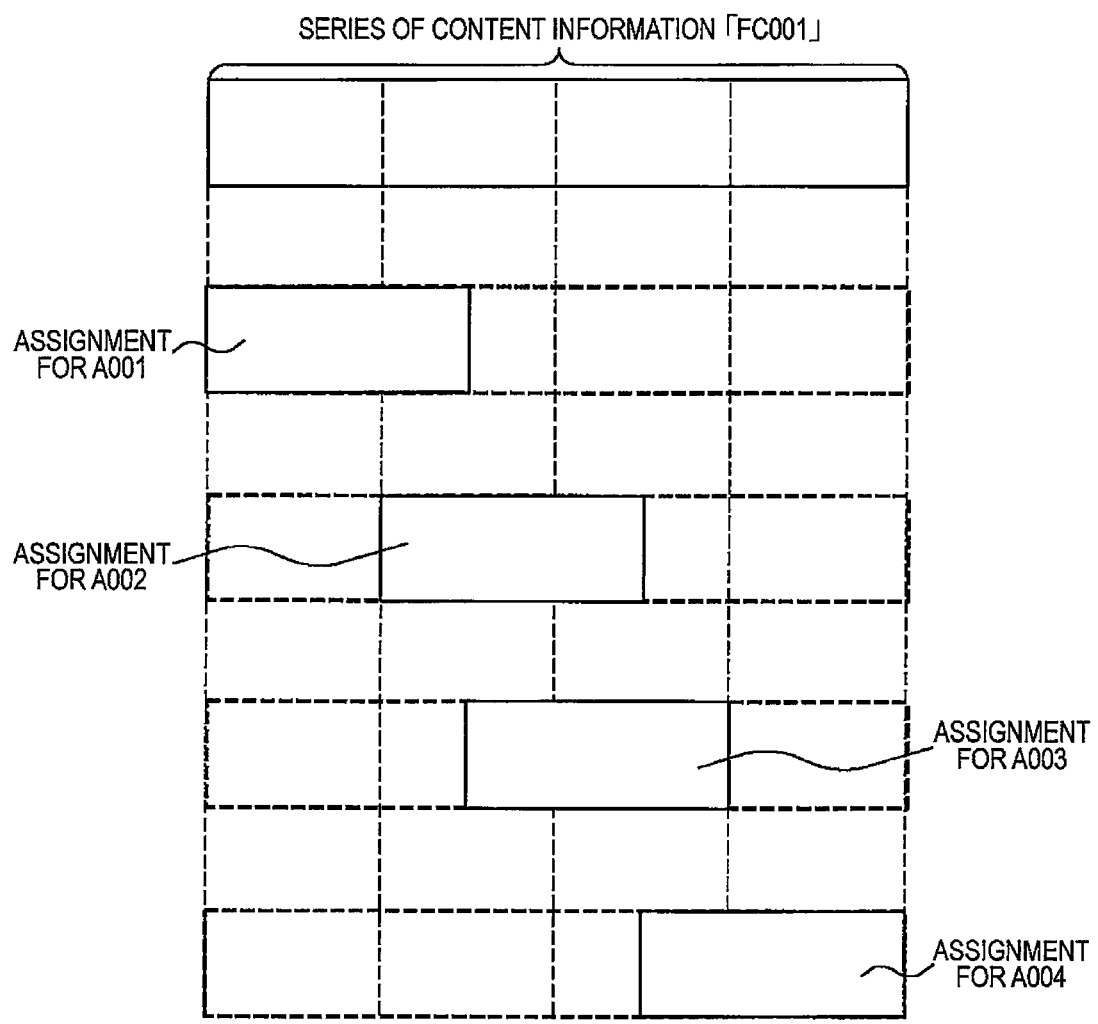
FIG. 27 is a diagram showing an example of fragmentation of a series of content information elements according to the same embodiment.

In FIG. 26, the case where each fragment content information element is redundant fragment content information capable of being configured by other fragment content information is shown, but only partial fragment content information may be redundant fragment content information capable of being configured by other fragment content information. For example, as shown in FIG. 27, fragment content information assigned to the content holding devices "A002" and "A003" is redundant fragment content information capable of being configured by other fragment content information, and fragment content information assigned to the content holding device "A001" and "A004" may not be configured by other fragment content information.

Here, the case where the specifying section 23 according to the embodiment 1 specifies fragment content information so that redundancy occurs has been described, but the specifying section 51 according to the embodiment 2 may specify fragment content information so that redundancy occurs. That is, the specifying section 51 specifies one or more content holding devices 6 holding content information including at least part of a series of content information elements requested in request information received by the request information receiving section 21, and a plurality of fragment content information elements included at least in the content information held by the one or more content holding devices 6 using correspondence information so that the series of content information elements requested in the request information is able to be configured by the plurality of fragment content information elements and at least one fragment content information element of the plurality of fragment content information elements is redundant fragment content information capable of being configured by other fragment content information.

In the case of the embodiment 2, since the content holding device 6 already holds fragment content information, redundant fragment content information may not be specified by the fragmentation method. To prevent this, the fragment specifying information configuring section 53 may configure fragment specifying information so that fragment content information after fragmentation becomes redundant fragment content information when fragment specifying information regarding a certain series of content information elements is configured. For example, as shown in FIG. 26 or FIG.

27, fragment content information is assigned to each content holding device 6 and fragment specifying information may be configured according to the assignment.

As such, according to the information communication system by this embodiment, at least one fragment content information element transmitted from the content holding devices 3 and 6 is redundant fragment content information capable of being configured by other fragment content information, so that a desired series of content information elements can be configured in the content receiving device 4 even when the redundant fragment content information has not been received by the content receiving device 4 due to an error or the like. Accordingly, even when an error or the like has occurred in the transmission of fragment content information, a process of retransmitting request information or requesting the retransmission of fragment content information in which an error has occurred may not be performed.

(Embodiment 4)

An information communication system according to an embodiment 4 of the present invention will be described with reference to the drawings. In the information communication system according to this embodiment, a server specifies fragment content information but does not transmit instruction information, and a content receiving device transmits instruction information.

The configuration of the information communication system is the same as that shown in FIG. 1 of the embodiment 1, except that the server 2 becomes a server 7, the content holding device 3 becomes a content holding device 6, and the content receiving device 4 becomes a content receiving device 8. The content holding device 6 is the same as described in FIG. 23 of the embodiment 2, and a description other than that of the server 7 and the content receiving device 8 is omitted.

Figure 28:
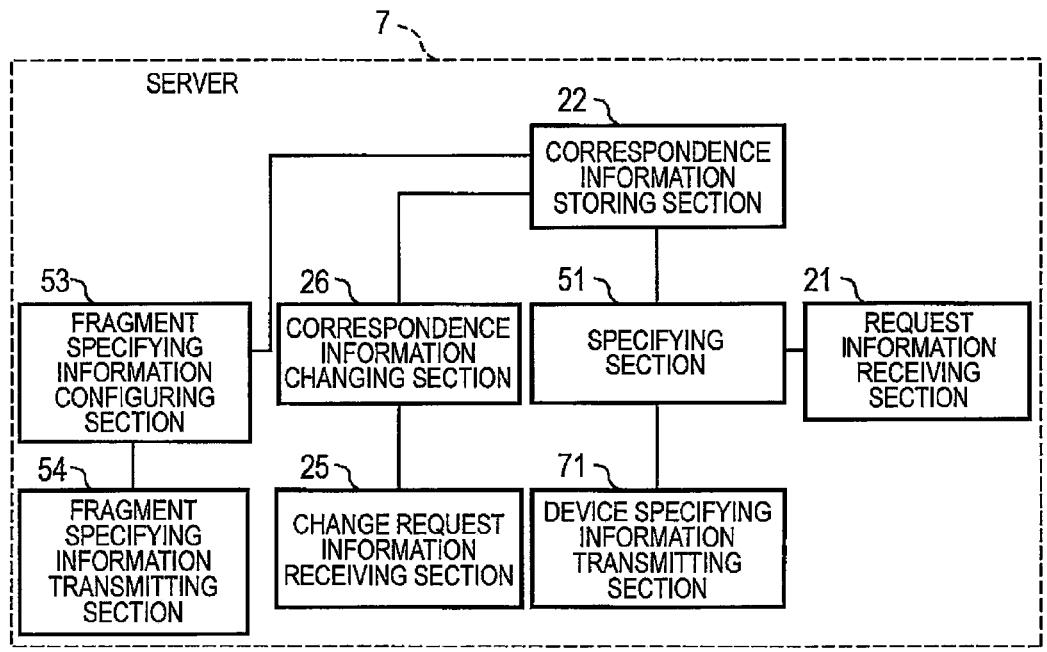
FIG. 28 is a block diagram showing a configuration of a server according to an embodiment 4 of the present invention.

FIG. 28 is a block diagram showing a configuration of the server 7 according to this embodiment. In FIG. 28, the server 7 according to this embodiment includes a request information receiving section 21, a correspondence information storing section 22, a change request information receiving section 25, a correspondence information changing section 26, a specifying section 51, a fragment specifying information configuring section 53, a fragment specifying information transmitting section 54, and a device specifying information transmitting section 71. The configuration and operation other than those of the device specifying information transmitting section 71 are the same as described in FIG. 22 of the embodiment 2, and a description thereof is omitted.

The device specifying information transmitting section 71 transmits device specifying information indicating a content holding device 6 and fragment content information specified by the specifying section 51 to the content receiving device 8. It can be known which transmission of fragment content information is assigned to which content holding device 6 by the device specifying information.

The device specifying information transmitting section 71 can acquire an address of the content receiving device 8 as a destination of the device specifying information from request information received by the request information receiving section 21. The device specifying information transmitting section 71 may directly transmit the device specifying information to the content receiving device 8 and may transmit the device specifying information through another server, the content requesting device 1, or the like.

The device specifying information transmitting section 71 may or may not include a transmitting device for performing transmission (for example, a modem, a network card, or the like). The device specifying information transmitting section 71 may be realized by hardware or may be realized by software such as a driver or like, which operates the transmitting device.

Figure 29:
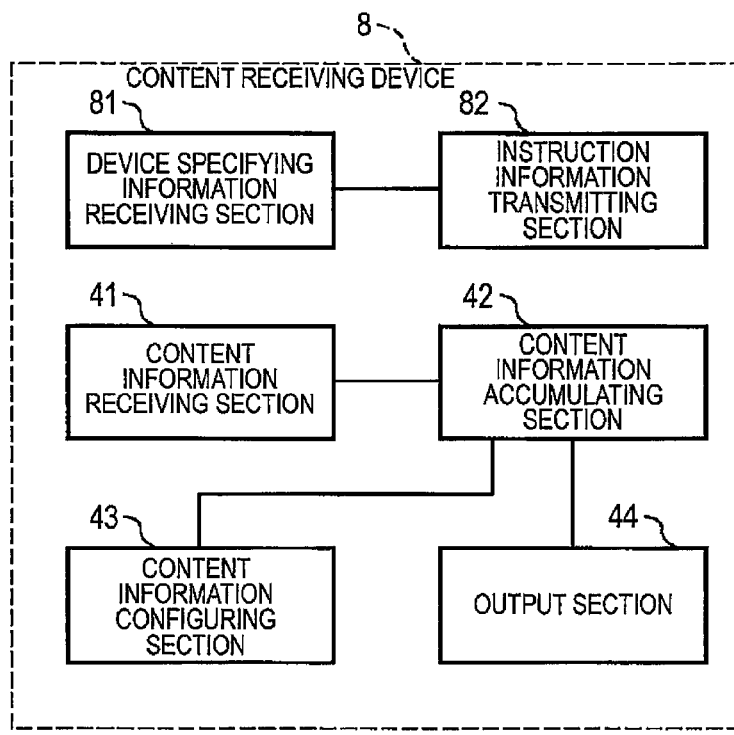
FIG. 29 is a block diagram showing a configuration of a content receiving device according to the same embodiment.

FIG. 29 is a block diagram showing a configuration of the content receiving device 8 according to this embodiment. In FIG. 29, the content receiving device 8 according to this embodiment includes a content information receiving section 41, a content information accumulating section 42, a content information configuring section 43, an output section 44, a device specifying information receiving section 81, and an instruction information transmitting section 82. The configuration and operation other than those of the device specifying information receiving section 81 and the instruction information transmitting section 82 are the same as those of the embodiment 1, and a description thereof is omitted.

The device specifying information receiving section 81 receives device specifying information transmitted by the device specifying information transmitting section 71. The device specifying information receiving section 81 may or may not include a receiving device for performing reception (for example, a modem, a network card, or the like). The device specifying information receiving section 81 may be realized by hardware or may be realized by software such as a driver or like, which operates the receiving device.

The instruction information transmitting section 82 transmits instruction information as information, instructing that fragment content information specified by the specifying section 51 be transmitted to the content receiving device 8, to a content holding device 6 specified by the specifying section 51 using device specifying information received by the device specifying information receiving section 81. That is, in this embodiment, instruction information transmitted by the server 5 in the embodiment 2 is transmitted by the content receiving device 8. To transmit the instruction information, the device specifying information is transmitted from the server 7 to the content receiving device 8.

In this case, the instruction information receiving section 31 of the content holding device 6 receives the instruction information transmitted from the content receiving device 8.

Figure 30:
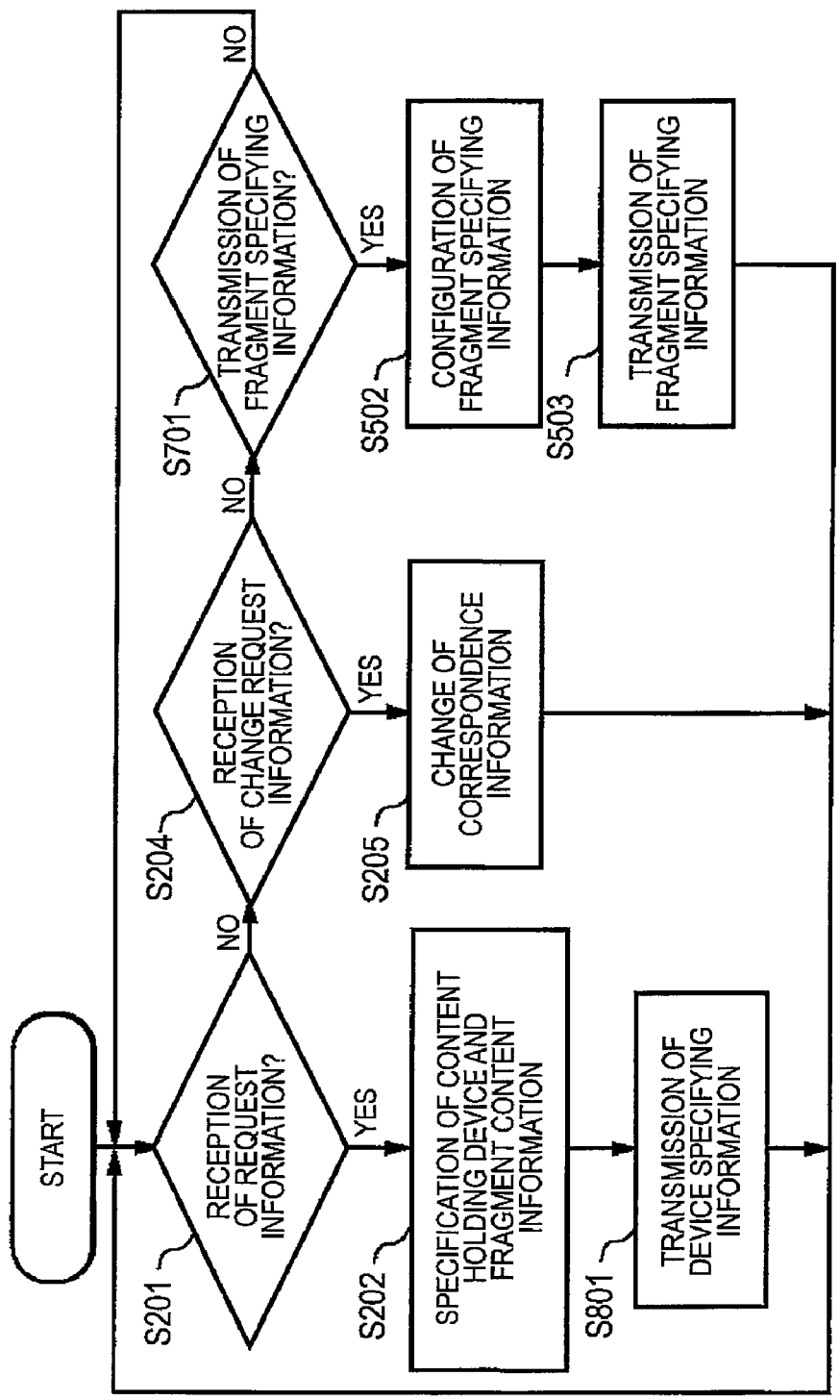
FIG. 30 is a flowchart showing an operation of the server according to the same embodiment.

Next, the operation of the server 7 according to this embodiment will be described using the flowchart of FIG. 30. The flowchart of FIG. 30 is the same as that of FIG. 24, except for the process of step S801.

(Step S801) The device specifying information transmitting section 71 transmits device specifying information to the content receiving device 8. Then, it returns to step S201.

Figure 31:
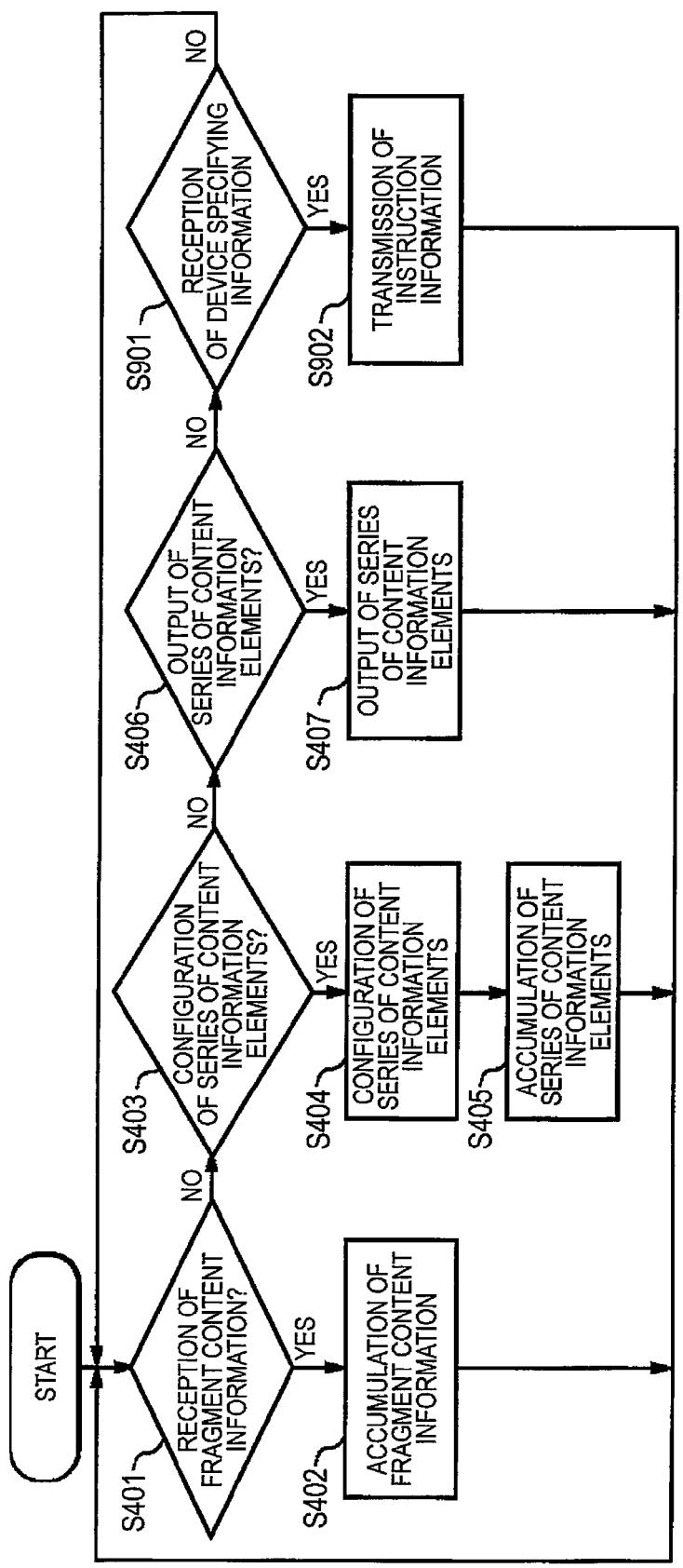
FIG. 31 is a flowchart showing an operation of the content receiving device according to the same embodiment.

Next, the operation of the content receiving device 8 according to this embodiment will be described using the flowchart of FIG. 31. The flowchart of FIG. 31 is the same as the flowchart of FIG. 9, except for the process of steps S901 and S902.

(Step S901) The device specifying information receiving section 81 receives device specifying information transmitted from the server 7.

(Step S902) The instruction information transmitting section 82 transmits instruction information to one or more content holding devices 6 using the device specifying information received by the device specifying information receiving section 81. Then, it returns to step S401.

Next, the operation of the information communication system according to this embodiment will be described using a specific example. Since it is the same as the description in the embodiment 2, except for a process of transmitting device specifying information and a process of transmitting instruction information according to the device specifying information, only the processes will be described.

The specifying section 51 specifies 4 content holding devices "A001", "A002", "A003" and "A004" holding fragment content information of a series of content information elements "FC001" and fragment content information of the series of content information elements "FC001" respectively held. Specifically, the specification is as follows.

© About content holding device "A001"
Content holding device ID: A001
Series-of-content-information-elements ID: FC001
Start position of fragment content information: 1st byte
End position of fragment content information: 5000th byte
© About content holding device "A002"
Content holding device ID: A002
Series-of-content-information-elements ID: FC001
Start position of fragment content information: 5001st byte
End position of fragment content information: 10000th byte
© About content holding device "A003"
Content holding device ID: A003
Series-of-content-information-elements ID: FC001
Start position of fragment content information: 10001st byte
End position of fragment content information: 15000th byte
© About content holding device "A004"
Content holding device ID: A004
Series-of-content-information-elements ID: FC001
Start position of fragment content information: 15001st byte
End position of fragment content information: 20000th byte The device specifying information transmitting section 71 configures a packet of device specifying information including information specifying the 4 content holding devices "A001", "A002", "A003" and "A004" and fragment content information held by each content holding device 6 thereof, and transmits the device specifying information packet to an address of the content receiving device 8 included in the request information received by the request information receiving section 21 (step S801).

The device specifying information packet is received by the device specifying information receiving section 81 of the content receiving device 8 (step S901). The information specifying the 4 content holding devices "A001", "A002", "A003" and "A004" and the fragment content information held by each content holding device 6 thereof is passed to the instruction information transmitting section 82.

The instruction information transmitting section 82 configures instruction information for each content holding device 6. The instruction information includes information specifying fragment content information included in the device specifying information, that is, fragment specifying information. For example, fragment specifying information corresponding to the content holding device "A001" is as follows.

[Fragment specifying information of content holding device "A001"]
Series-of-content-information-elements ID: FC001
Start position of fragment content information: 1st byte
End position of fragment content information: 5000th byte Then, the instruction information transmitting section 82 transmits instruction information to each content holding device 6 (step S902). As described in the embodiment 1, it is assumed that the instruction information includes fragment specifying information and information capable of specifying a destination of the content receiving device 8. A process in which the instruction information is received by the content holding device 6 and fragment content information is transmitted from the content holding device 6 to the content receiving device 8 is the same as described in the embodiment 2, and a description thereof is omitted.

As such, in the information communication system according to this embodiment, device specifying information is transmitted from the server 7 to the content receiving device 8 and instruction information is transmitted from the content receiving device 8 to the content holding device 6, so that the content receiving device 8 can acquire a desired series of content information elements. Accordingly, the content requesting device 1 does not need to transmit request information to each of the content holding devices 6 and a process of the content requesting device 1 is simplified.

In the information communication system according to this embodiment, since the content receiving device 8 itself, which receives fragment content information, transmits instruction information, the content receiving device 8 can receive fragment content information, for example, by a content information management request or the like, even when management for transmitting fragment content information is performed only in response to instruction information from a device, which receives fragment content information.

In this embodiment, a case has been described where device specifying information is transmitted from the server 7 to the content receiving device 8 and the content receiving device 8 transmits instruction information to the content holding device 6 according to the device specifying information in the information communication system according to the embodiment 2, but device specifying information may be transmitted from the server to the content receiving device and the content receiving device may transmit instruction information to the content holding device 3 according to the device specifying information in the information communication system according to the embodiment 1.

Also in this embodiment like the embodiment 3, at least one fragment content information element of a specified plurality of fragment content information elements may be a redundant element capable of being configured by other specified fragment content information.

In this embodiment, the server 7 includes a correspondence information storing section 22, a change request information receiving section 25, a correspondence information changing section 26, a fragment specifying information configuring section 53, and a fragment specifying information transmitting section 54, and the specification of a content holding device 6 or fragment content information may be performed in another server. In this case, for example, correspondence information stored in the correspondence information storing section 22 is passed to another server, so that the server may specify a content holding device 6 or the like using the correspondence information.

In this embodiment, the case where correspondence information stored in the correspondence information storing section 22 is changed according to transmission of fragment specifying information has been described in the embodiment 2.

In each embodiment described above, when each device has two or more components to perform communication (for example, transmitting sections or receiving sections) and the two or more components have communication devices, the communication devices may be the same physical device or different devices.

Figure 32:
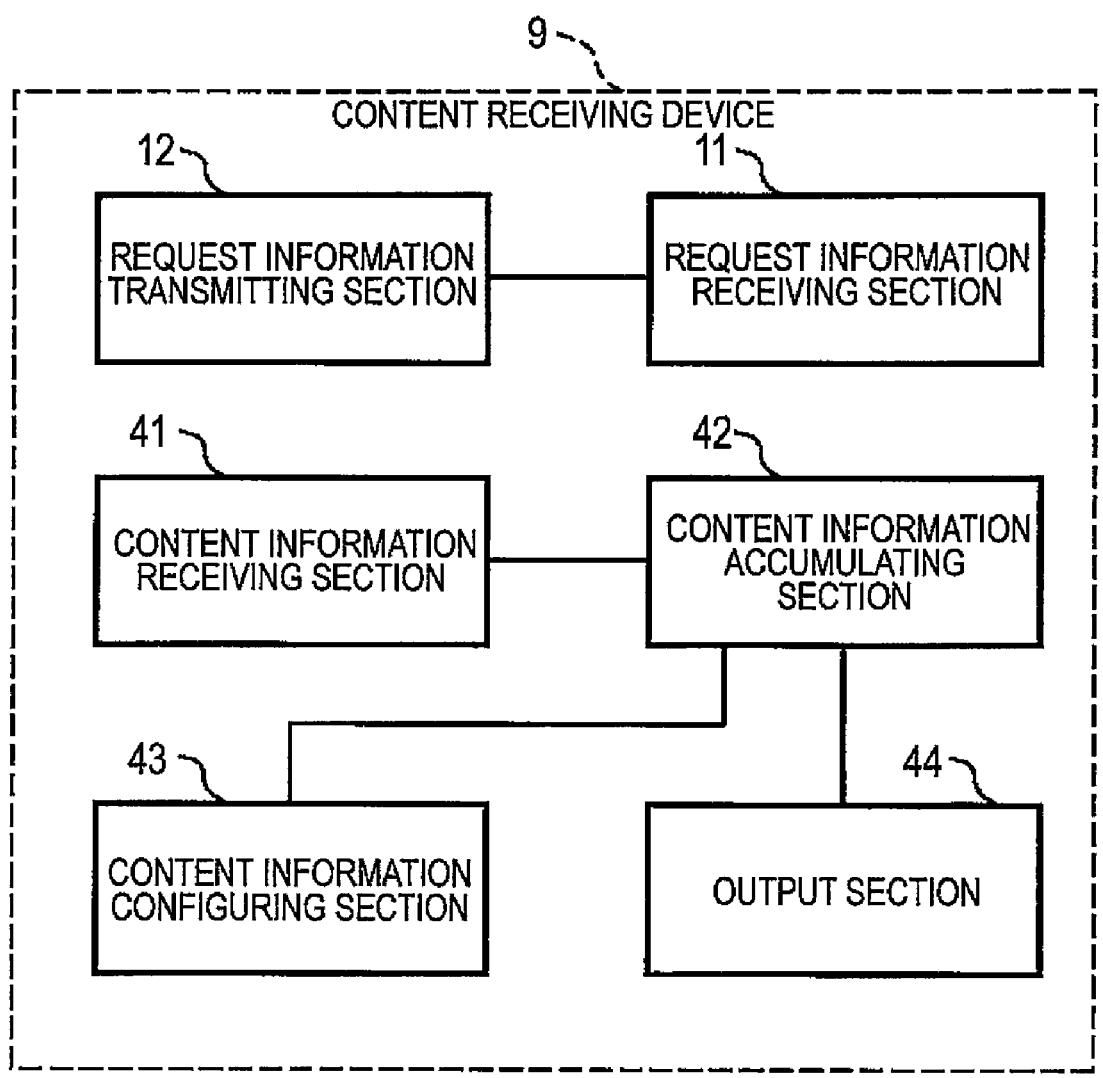
FIG. 32 is a block diagram showing a configuration of a content receiving device according to another embodiment.

In each embodiment described above, the case where the content requesting device 1 and the content receiving devices 4 and 8 are separate devices has been described, but the content requesting device 1 and the content receiving devices 4 and 8 may be configured as an integrated device. In this case, for example, as shown in FIG. 32, a content receiving device 9 may include a request information receiving section 11, a request information transmitting section 12, a content information receiving section 41, a content information accumulating section 42, a content information configuring section 43, and an output section 44. The content receiving device 9 like the content receiving device 8 may additionally include a device specifying information receiving section 81 and an instruction information transmitting section 82. Here, for convenience, a device having functions of the content requesting device 1 and the content receiving devices 4 and 8 is referred to as the content receiving device 9. This device may also be referred to as the content requesting device. As such, in the case where the content requesting device 1 and the content receiving devices 4 and 8 are configured as the content receiving device 9, which is the integrated device, the request information receiving section 21 receives request information transmitted from the content receiving device 9.

In the above-described embodiment, each process or each function may be realized by centralized processing by a single device or a single system, or may be realized by decentralized processing by a plurality of devices or a plurality of systems.

In the above-described embodiment, each component may be configured by dedicated hardware or a component capable of being realized by software may be realized by running a program. For example, a software program recorded on a recording medium of a hard disk or semiconductor memory is read and run by a program running section of a CPU or the like, so that each component can be realized. Software to realize the server in the above-described embodiment is the following program. That is, this program is a program for making a computer execute a process in a server configuring an information communication system having the server, a plurality of content holding devices holding content information including at least fragment content information as information into which a series of content information elements has been fragmented, a content requesting device which requests content information, and a content receiving device which receives the fragment content information, the program including: a request information receiving step of receiving request information as information requesting a series of content information transmitted from the content requesting device; a specifying step of specifying one or more content holding devices and a plurality of fragment content information elements included at least in content information, held by the one or more content holding devices, using correspondence information, stored in a correspondence information storing section, as information indicating the correspondence of the plurality of content holding devices with content information including at least fragment content information held by each of the plurality of content holding devices so that a series of content information elements requested in request information received by the request information receiving section is able to be configured by the plurality of fragment content information elements; and an instruction information transmitting step of transmitting instruction information as information, instructing that fragment content information specified in the specifying step be transmitted to the content receiving device, to a content holding device specified by the specifying section.

Other software to realize the server in the above-described embodiment is the following program. That is, this program is a program for executing a process in a server configuring an information communication system having the server and a plurality of content holding devices holding content information including at least fragment content information as information into which a series of content information elements has been fragmented, the program including: a change request information receiving step of receiving change request information as information requesting a change of correspondence information according to acquisition of a series of content information elements in the content holding devices; a correspondence information changing step of changing correspondence information, stored in a correspondence information storing section, as information indicating the correspondence of a plurality of content holding devices with content information including at least fragment content information held by each of the plurality of content holding devices according to the change request information received in the change request information receiving step; a fragment specifying information configuring step of respectively configuring fragment specifying information as information for specifying fragment content information included in a series of content information elements for every plurality of content holding devices holding the series of content information elements serving as a fragmentation target; and a fragment specifying information transmitting step of transmitting the fragment specifying information configured in the fragment specifying information configuring step to a content holding device corresponding to the fragment specifying information.

Software to realize the content holding device in the above-described embodiment is the following program. That is, this program is a program for executing a process in a content holding device configuring an information communication system having a server, a plurality of content holding devices holding content information including at least fragment content information as information into which a series of content information elements has been fragmented, a content requesting device which requests the content information, and a content receiving device which receives the fragment content information, the program including: an instruction information receiving step of receiving instruction information as information instructing that the fragment content information transmitted from the server be transmitted to the content receiving device; and a content information transmitting step of reading the fragment content information indicated by the instruction information received in the instruction information receiving step from a content information storing section in which content information including at least the fragment content information is stored, and transmitting the fragment content information to the content receiving device.

Software to realize the content holding device in the above-described embodiment is the following program. That is, this program is a program for executing a process in a content holding device configuring an information communication system having a server and a plurality of content holding devices holding content information including at least fragment content information as information into which a series of content information elements has been fragmented, the program including: an instruction information receiving step of receiving instruction information as information instructing that fragment content information be transmitted; a content information transmitting step of reading fragment content information indicated by the instruction information received in the instruction information receiving step from a content information storing section in which content information including at least fragment content information is stored, and transmitting the fragment content information to the content receiving device; a content information acquiring step of acquiring a series of content information elements and accumulating the series of content information elements in the content information storing section; a change request information transmitting step of transmitting change request information as information requesting a change according to acquisition of the series of content information elements by the content information acquiring section for correspondence information as information held by the server and information indicating the correspondence of the plurality of content holding devices with content information held by the plurality of content holding devices; a fragment specifying information receiving step of receiving fragment specifying information as information for specifying the fragment content information included in the series of content information elements transmitted from the server; and a fragmentation step of generating the fragment content information by fragmenting the series of content information elements stored in the content information storing section according to the fragment specifying information received in the fragment specifying receiving step, and accumulating the fragment content information in the content information storing section.

Software to realize the content receiving device in the above-described embodiment is the following program. That is, this program is a program for executing a process in a content receiving device configuring an information communication system having a server, a plurality of content holding devices holding content information including at least fragment content information as information into which a series of content information elements has been fragmented, and the content receiving device which receives the fragment content information by requesting the content information, the program including: a request information transmitting step of transmitting request information as information requesting a series of content information elements to the server; a content information receiving step of receiving a plurality of fragment content information elements, transmitted from the content holding devices, that are able to configure the series of content information elements requested in the request information transmitted in the request information transmitting step; and a content information accumulating step of accumulating the fragment content information elements received in the content information receiving step.

The program does not include at least a process to be performed only by hardware in the step of transmitting information or the step of receiving information, for example, a process to be performed by a modem or an interface card in the transmitting step.

This program may be run by download from a server or the like, or may be run by reading a program recorded on a predetermined recording medium (for example, an optical disk such as a CD-ROM, a magnetic disk, a semiconductor memory, or the like).

One or more computers may run this program. That is, centralized processing or decentralized processing may be performed.

The present invention is not limited to the above-described embodiments. Various modifications can be made within the scope of the present invention.

While the present invention has been described in detail or with reference to a specific embodiment, it will be obvious to those skilled in the art that other modifications may be made without departing from the spirit and scope of the invention.

This application is based on Japanese Patent Application (Patent Application No. 2007-108883) filed on Apr. 18, 2007, the disclosure of which is incorporated herein by reference.

<Industrial Applicability>

From the above, an information communication system or the like according to the present invention can easily request the transmission of fragment content information even when fragment content information is transmitted from a plurality of devices, and is useful as an information communication system or the like to transmit/receive content information.

The invention claimed is:

1. An information communication system comprising:
a server;
a plurality of content holding devices holding content information including at least fragment content information as information into which a series of content information elements has been fragmented;
a content requesting device which requests the content information; and
a content receiving device which receives the fragment content information,
wherein the content requesting device includes
a request information transmitting section which transmits request information as information requesting a series of content information elements to the server,
wherein the content receiving device includes:
a content information receiving section which receives fragment content information transmitted from the content holding devices; and
a content information accumulating section which accumulates the fragment content information received by the content information receiving section,
wherein the server includes:
a request information receiving section which receives the request information;
a correspondence information storing section which stores correspondence information as information indicating the correspondence of a plurality of content holding devices with content information including at least fragment content information held by each of the content holding devices;
a specifying section which specifies one or more content holding devices and a plurality of fragment content information elements included at least in content information, held by the one or more content holding devices, using the correspondence information so that a series of content information elements requested in request information received by the request information receiving section is able to be configured by the plurality of fragment content information elements;
an instruction information transmitting section which transmits instruction information, as information instructing that fragment content information specified by the specifying section be transmitted to the content receiving device, to a content holding device specified by the specifying section;
a specification request information receiving section which receives specification request information as information requesting the specification of fragment content information included in a series of content information elements to be deleted from the content holding device;
a fragment specifying information configuring section which configures, when the specification request information receiving section has received the specification request information, fragment specifying information as information for specifying fragment content information included in a series of content information elements for the content holding device transmitting the specification request information; and
a fragment specifying information transmitting section which transmits the fragment specifying information configured by the fragment specifying information configuring section to the content holding device transmitting the specification request information, wherein the content holding device includes:
a content information storing section which stores content information including at least fragment content information;
an instruction information receiving section which receives the instruction information;
a content information transmitting section which reads the fragment content information indicated by the instruction information received by the instruction information receiving section from the content information storing section and transmits the fragment content information to the content receiving device;
a fragmentation section which generates fragment content information by fragmenting the series of content information elements stored in the content information storing section, and accumulates the fragment content information in the content information storing section;
a deletion instruction receiving section which receives an instruction about the deletion of the series of content information elements stored in the content information storing section; and
a specification request information transmitting section which transmits the specification request information when the deletion instruction receiving section has received the deletion instruction,
wherein the fragment specifying information configuring section configures fragment specifying information as information for specifying a plurality of fragment content information elements for fragmenting the series of content information elements based on a predetermined fragmentation rule, assigning any of the fragment content information elements to the content holding device which transmitted the specification request information, and specifying the assigned fragment content information,
wherein the fragment specifying information configuring section further configures a plurality of fragment specifying information elements so as to be fragmented into a number of fragments according to a number of content holding devices holding at least a part of the series of content information elements for which the specification of fragment content information has been requested by the specification request information received by the specification request information receiving section,
wherein the instruction information includes fragment specifying information as information for specifying fragment content information included in the series of content information elements held by the specified content holding devices, and
wherein the fragmentation section generates fragment content information to be continuously held, by fragmenting the series of content information elements corresponding to the deletion instruction based on fragment specifying information included in the deletion instruction received by the deletion instruction receiving section, and deletes the series of content information elements corresponding to the deletion instruction.

2. A server apparatus that configures an information communication system including the server apparatus, a plurality of content holding devices holding content information including at least fragment content information as information into which a series of content information elements has been fragmented, a content requesting device which requests the content information, and a content receiving device which receives the fragment content information, the server apparatus comprising:

a processor configured to execute computer-executable components comprising:
a request information receiving section which receives request information as information requesting a series of content information elements transmitted from the content requesting device;
a correspondence information storing section which stores correspondence information as information indicating the correspondence of a plurality of content holding devices with content information including at least fragment content information held by each of the plurality of content holding devices;
a specifying section which specifies one or more content holding devices and a plurality of fragment content information elements included at least in content information, held by the one or more content holding devices, using the correspondence information so that the series of content information elements requested in the request information received by the request information receiving section is able to be configured by the plurality of fragment content information elements;
an instruction information transmitting section which transmits instruction information, as information instructing that fragment content information specified by the specifying section be transmitted to the content receiving device, to a content holding device specified by the specifying section;
a specification request information receiving section which receives specification request information as information requesting the specification of fragment content information included in a series of content information elements to be deleted from the content holding device;
a fragment specifying information configuring section which configures, when the specification request information receiving section has received the specification request information, fragment specifying information as information for specifying fragment content information included in a series of content information elements for the content holding device transmitting the specification request information; and
a fragment specifying information transmitting section which transmits the fragment specifying information configured by the fragment specifying information configuring section to the content holding device transmitting the specification request information,
wherein the fragment specifying information configuring section configures fragment specifying information as information for specifying a plurality of fragment content information elements for fragmenting the series of content information elements based on a predetermined fragmentation rule, assigning any of the fragment content information elements to the content holding device which transmitted the specification request information, and specifying the assigned fragment content information, and
wherein the fragment specifying information configuring section further configures a plurality of fragment specify information elements so as to be fragmented into a number of fragments according to a number of content holding devices holding at least a part of the series of content information elements for which the specification of fragment content information has been requested by the specification request information received by the specification request information receiving section.

3. The server apparatus according to claim 2, wherein the instruction information includes fragment specifying information.

4. The server apparatus according to claim 2, the computer-executable components further comprising:
- a change request information receiving section which receives change request information as information requesting a change of the correspondence information according to acquisition of a series of content information elements in the content holding devices; and
- a correspondence information changing section which changes the correspondence information according to the change request information received by the change request information receiving section.

5. The server apparatus according to claim 2, wherein the fragment specifying information configuring section further configures fragment specifying information as information for specifying fragment content information included in related content information held by a related content holding device, which is a content holding device holding related content information as content information including at least part of a series of content information elements for which the specification of fragment content information is requested by the specification request information among content holding devices other than the content holding device transmitting the specification request information,
- wherein the fragment specifying information transmitting section transmits the fragment specifying information, configured by the fragment specifying information configuring section for related content information held by the related holding device, to the related holding device.

6. The server apparatus according to claim 5, wherein the related content information is fragment content information.

7. The server apparatus according to claim 2, wherein the specifying section specifies one or more content holding devices holding content information including at least part of a series of content information elements requested in the request information received by the request information receiving section and a plurality of fragment content information elements included at least in content information held by the one or more content holding devices using the correspondence information so that a series of content information elements requested in the request information is able to be configured by the plurality of fragment content information elements and at least one fragment content information element of the plurality of fragment content information elements is redundant fragment content information capable of being configured by other fragment content information.

8. The server apparatus according to claim 2, wherein the fragment specifying information configuring section configures a plurality of fragment specifying information elements so as to be fragmented according to a position of fragmentation that has been previously determined for each of the series of content information elements.

9. A content holding device configuring an information communication system having a server, a plurality of content holding devices holding content information including at least fragment content information as information into which a series of content information elements has been fragmented, and a content receiving device which receives the fragment content information, the content holding device comprising:
- a content information storing section which stores content information including at least the fragment content information;
- a fragmentation section which generates fragment content information by fragmenting the series of content information elements stored in the content information storing section, and accumulates the fragment content information in the content information storing section;
- an instruction information receiving section which receives instruction information as information instructing that the fragment content information transmitted from the server be transmitted to the content receiving device;
- a content information transmitting section which reads the fragment content information indicated by the instruction information received by the instruction information receiving section from the content information storing section and transmits the fragment content information to the content receiving device;
- a deletion instruction receiving section which receives a deletion instruction about the deletion of the series of content information elements stored in the content information storing section; and
- a specification request information transmitting section which transmits specification request information as information requesting the specification of fragment content information to be continuously held, among the series of content information elements to be deleted, when the deletion instruction receiving section has received the deletion instruction,
- wherein the instruction information includes fragment specifying information as information for specifying fragment content information included in the series of content information elements held by the specified content holding devices,
- wherein the fragment specifying information is one in which a plurality of fragment content information elements have been specified in the server, so as to be fragmented into a number of fragments according to a number of content holding devices holding at least a part of the series of content information elements for which the specification of fragment content information has been requested by the specification request information transmitted by the specification request information transmitting section, and
- wherein the fragmentation section generates fragment content information to be continuously held, by fragmenting the series of content information elements corresponding to the deletion instruction based on fragment specifying information included in the deletion instruction received by the deletion instruction receiving section, and deletes the series of content information elements corresponding to the deletion instruction.

10. The content holding device according to claim 9, wherein the fragment specifying information receiving section also receives fragment specifying information for specifying fragment content information included in related content information as content information including at least part of a series of content information elements for which the specification of the fragment content information is requested by specification request information transmitted by another content holding device.

11. The content holding device according to claim 10, wherein the related content information is fragment content information.

12. The content holding device according to claim 9, further comprising:
- a change request information transmitting section which transmits change request information as information requesting a change according to the fragmentation by the fragmentation section for correspondence information as information held by the server and information indicating the correspondence of the plurality of content holding devices with content information held by the plurality of content holding devices.

13. The content holding device according to claim 12, further comprising:

a content information acquiring section which acquires a series of content information elements and accumulates the series of content information elements in the content information storing section, wherein the change request information transmitting section also transmits change request information, as information requesting a change of the correspondence information according to acquisition of the series of content information elements by the content information acquiring section, to the server.

14. The content holding device according to claim 9, wherein the fragment specifying information is one in which a plurality of fragment content information elements have been specified in the server, so as to be fragmented according to a position of fragmentation that has been previously determined for each of the series of content information elements.

15. An information processing method to be processed in a server configuring an information communication system having the server, a plurality of content holding devices holding content information including at least fragment content information as information into which a series of content information elements has been fragmented, a content requesting device which requests content information, and a content receiving device which receives the fragment content information, the method comprising:

a request information receiving step of receiving request information as information requesting a series of content information transmitted from the content requesting device;

a specifying step of specifying one or more content holding devices and a plurality of fragment content information elements included at least in content information, held by the one or more content holding devices, using correspondence information, stored in a correspondence information storing section, as information indicating the correspondence of the plurality of content holding devices with content information including at least fragment content information held by each of the plurality of content holding devices so that a series of content information elements requested in request information received by the request information receiving section is able to be configured by the plurality of fragment content information elements; and an instruction information transmitting step of transmitting instruction information as information, instructing that fragment content information specified in the specifying step be transmitted to the content receiving device, to a content holding device specified by the specifying section, a specification request information receiving step of receiving specification request information as information requesting the specification of fragment content information to be continuously held, among the series of content information elements to be deleted from the content holding device;

a fragment specifying information configuring step of configuring, when the specification request information has been received in the specification request information receiving step, fragment specifying information as information for specifying fragment content information included in the series of content information elements for the content holding device which transmitted the specification request information; and a fragment specifying information transmitting step of transmitting the fragment specifying information configured in the fragment specifying information configuring step to the content holding device which transmitted the specification request information, wherein, in the fragment specifying information configuring step, fragment specifying information as information for specifying a plurality of fragment content information elements for fragmenting the series of content information elements based on a predetermined fragmentation rule, assigning any of the fragment content information elements to the content holding device which transmitted the specification request information, and specifying the assigned fragment content information, is configured wherein, in the fragment specifying information configuring step, a plurality of fragment specifying information elements so as to be fragmented into a number of fragments according to a number of content holding devices holding at least a part of the series of content information elements for which the specification of fragment content information has been requested by the specification request information received by the specification request information receiving section, is configured.

16. An information processing method to be processed in a content holding device configuring an information communication system having a server, a plurality of content holding devices holding content information including at least fragment content information as information into which a series of content information elements has been fragmented, a content requesting device which requests the content information, and a content receiving device which receives the fragment content information, the method comprising:

a fragmentation step of generating the fragment content information by fragmenting the series of content information elements stored in the content information storing section, and accumulating the fragment content information in the content information storing section;

an instruction information receiving step of receiving instruction information as information instructing that the fragment content information transmitted from the server be transmitted to the content receiving device; and a content information transmitting step of reading the fragment content information indicated by the instruction information received in the instruction information receiving step from a content information storing section in which content information including the series of content information elements and the fragment content information is stored, and transmitting the fragment content information to the content receiving device;

a deletion instruction receiving step of receiving an instruction about the deletion of the series of content information elements stored in the content information storing section; and a specification request information transmitting step of transmitting specification request information as information requesting the specification of fragment content information to be continuously held, among the series of content information elements to be deleted, when the deletion instruction has been received in the deletion instruction receiving step, wherein the instruction information includes fragment specifying information as information for specifying fragment content information included in the series of content information elements held by specified content holding devices, and wherein, in the fragmentation step, fragment content information to be continuously head is generated by fragmenting the series of content information elements corresponding to the deletion instruction based on fragment specifying information included in the deletion instruction received in the deletion instruction receiving step, to delete the series of content information elements corresponding to the deletion instruction, wherein the fragment specifying information is one in which a plurality of fragment content information elements have been specified in the server, so as to be fragmented into a number of fragments according to a number of content holding devices holding at least a part of the series of content information elements for which the specification of fragment content information has been requested by the specification request information transmitted by the specification request information transmitting section.

17. A non-transitory computer-readable storage medium storing computer-executable instructions for causing a server to configure an information communication system having the server, a plurality of content holding devices holding content information including at least fragment content information as information into which a series of content information elements has been fragmented, a content requesting device which requests content information, and a content receiving device which receives the fragment content information, the computer-readable storage medium comprising:

instructions for causing the server to receive request information as information requesting a series of content information transmitted from the content requesting device;

instructions for causing the server to specify one or more content holding devices and a plurality of fragment content information elements included at least in content information, held by the one or more content holding devices, using correspondence information, stored in a correspondence information storing section, as information indicating the correspondence of the plurality of content holding devices with content information including at least fragment content information held by each of the plurality of content holding devices so that a series of content information elements requested in request information received by the request information receiving section is able to be configured by the plurality of fragment content information elements;

instructions for causing the server to transmit instruction information as information, instructing that fragment content information specified be transmitted to the content receiving device, to a content holding device specified;

instructions for causing the server to receive specification request information as information requesting the specification of fragment content information to be continuously held, among the series of content information elements to be deleted from the content holding device;

instructions for causing the server to configure, when the specification request information has been received in the specification request information receiving step, fragment specifying information as information for specifying fragment content information included in the series of content information elements for the content holding device which transmitted the specification request information; and instructions for causing the server to transmit the fragment specifying information configured in the fragment specifying information configuring step to the content holding device which transmitted the specification request information, by means of the server, wherein, in the instructions for causing the server to configure fragment specifying information, fragment specifying information as information for specifying a plurality of fragment content information elements for fragmenting a series of content information elements based on a predetermined fragmentation rule, assigning any of the fragment content information elements to the content holding device which transmitted the specification request information, and specifying the assigned fragment content information, is configured, wherein the fragment specifying information is one in which a plurality of fragment content information elements are specified so as to be fragmented into a number of fragments according to a number of content holding devices holding at least a part of the series of content information elements.

18. A non-transitory computer-readable storage medium storing computer-executable instructions for causing a content holding device to configure an information communication system having a server, a plurality of content holding devices holding content information including at least fragment content information as information into which a series of content information elements has been fragmented, a content requesting device which requests the content information, and a content receiving device which receives the fragment content information, the computer-readable storage medium comprising:

instructions for causing the content holding device to generate the fragment content information by fragmenting the series of content information elements stored in the content information storing section, and accumulating the fragment content information in the content information storing section;

instructions for causing the content holding device to receive instruction information as information instructing that the fragment content information transmitted from the server be transmitted to the content receiving device;

instructions for causing the content holding device to read the fragment content information indicated by the instruction information received from a content information storing section in which content information including the series of content information elements and the fragment content information is stored, and to transmit the fragment content information to the content receiving device;

instructions for causing the content holding device to receive a deletion instruction about the deletion of the series of content information elements stored in the content information storing section; and instructions for causing the content holding device to transmit specification request information as information requesting the specification of fragment content information to be continuously held, among the series of content information elements to be deleted, when the deletion instruction has been received in the deletion instruction receiving step, wherein the instruction information includes fragment specifying information as information for specifying fragment content information included in the series of content information elements held by specified content holding devices, and wherein, the fragment content information to be continuously head is generated by fragmenting the series of content information elements corresponding to the deletion instruction based on fragment specifying information included in the deletion instruction received in the deletion instruction receiving step, to delete the series of content information elements corresponding to the deletion instruction, and wherein the fragment specifying information is one in which a plurality of fragment content information elements are specified so as to be fragmented into a number of fragments according to a number of content holding devices holding at least a part of the series of content information elements.

* * * * *